(12) United States Patent
Masuyama et al.

(10) Patent No.: US 9,103,976 B2
(45) Date of Patent: Aug. 11, 2015

(54) METHOD FOR MANUFACTURING WAVEGUIDE-TYPE SEMICONDUCTOR DEVICE

(71) Applicant: SUMITOMO ELECTRIC INDUSTRIES, LTD., Osaka-shi, Osaka (JP)

(72) Inventors: Ryuji Masuyama, Kamakura (JP); Yoshihiro Yoneda, Isehara (JP); Hideki Yagi, Machida (JP); Naoko Konishi, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/280,043

(22) Filed: May 16, 2014

(65) Prior Publication Data
US 2014/0342491 A1    Nov. 20, 2014

(30) Foreign Application Priority Data

May 17, 2013    (JP) ................................. 2013-105434

(51) Int. Cl.
*H01L 21/00* (2006.01)
*G02B 6/13* (2006.01)
*G02B 6/12* (2006.01)

(52) U.S. Cl.
CPC ...... *G02B 6/131* (2013.01); *G02B 2006/12173* (2013.01); *G02B 2006/12178* (2013.01)

(58) Field of Classification Search
CPC .... H01L 21/56; H01L 21/768; H01L 31/0687
USPC ..................................... 438/69; 257/432, 443
See application file for complete search history.

(56) References Cited

U.S. PATENT DOCUMENTS

| | | | | |
|---|---|---|---|---|
| 5,859,866 | A * | 1/1999 | Forrest et al. | 372/50.124 |
| 6,984,840 | B2 * | 1/2006 | Kuramata et al. | 257/11 |
| 8,467,637 | B2 * | 6/2013 | Fujikata et al. | 385/14 |
| 8,624,103 | B2 * | 1/2014 | Li | 136/249 |
| 2012/0235265 | A1 * | 9/2012 | Takabayashi | 257/432 |
| 2012/0243824 | A1 * | 9/2012 | Takabayashi | 385/14 |

FOREIGN PATENT DOCUMENTS

JP    2001-127333 A    5/2001

* cited by examiner

*Primary Examiner* — Mohammad Islam
*Assistant Examiner* — Chi-Hua Yang
(74) *Attorney, Agent, or Firm* — Smith, Gambrell & Russell LLP

(57) ABSTRACT

A method for manufacturing a waveguide-type semiconductor device includes the steps of forming an epitaxial structure including a waveguide mesa and a device mesa; forming a mask for selective growth on the epitaxial structure; growing a semiconductor region on an end surface of the device mesa by using the mask for selective growth, the semiconductor region including a side portion having a layer shape and a protruding wall portion; forming an ohmic electrode on a top surface of the device mesa; forming a resin layer on the device mesa and the semiconductor region; forming a resin mask having an opening on the ohmic electrode; forming an electric conductor connecting the ohmic electrode to an electrode pad, the electric conductor passing over the protruding wall portion while making contact with a surface of the resin mask; and removing the resin mask after forming the electric conductor.

9 Claims, 21 Drawing Sheets

METHOD FOR MANUFACTURING WAVEGUIDE-TYPE SEMICONDUCTOR DEVICE

BACKGROUND OF THE INVENTION

1. Field of the Invention

The present invention relates to a method for manufacturing a waveguide-type semiconductor device.

2. Description of the Related Art

Patent Document 1 (Japanese Unexamined Patent Application Publication No. 2001-127333) discloses a semiconductor photoreceiver formed on a substrate. The semiconductor photoreceiver has a suitable structure for high-speed operation. The semiconductor photoreceiver includes a light-detecting portion formed on the substrate. The light-detecting portion includes an absorption layer that is composed of a semiconductor. The absorption layer receives light and generates a carrier in accordance with the intensity of the light. The semiconductor photoreceiver also includes a waveguide formed on the substrate that is integrated with the light-detecting portion. The waveguide is optically coupled to the light-detecting portion. Light propagating through the waveguide is input to the absorption layer of the light-detecting portion. The light-detecting portion of the semiconductor photoreceiver has a mesa structure having side surfaces that are covered with a semi-insulating semiconductor layer. The mesa structure of the light-detecting portion includes the absorption layer, a p-type layer, and a cap layer. In addition, the light-detecting portion has an electrode formed on the mesa structure. An electric field is applied to the absorption layer of the light-detecting portion through the electrode.

In the semiconductor photoreceiver disclosed in Patent Document 1, a semiconductor layer composed of semi-insulating InP is formed on the side surfaces of the mesa structure of the light-detecting portion.

SUMMARY OF THE INVENTION

A semiconductor device, such as a light-receiving device, may be integrated with an optical waveguide connected to the semiconductor device. Therefore, the semiconductor device and the optical waveguide constitute a semiconductor integrated device. In the semiconductor integrated device, each of the semiconductor device and the optical waveguide has a mesa structure. In addition, a protection layer composed of semiconductor material is grown on side surfaces of the mesa structure of the semiconductor device. Accordingly, a process of producing the semiconductor integrated device includes a step of forming mesa structures of the semiconductor device and the optical waveguide; and a step of growing a semiconductor layer on a side surface of the mesa structure of the semiconductor device. The side surface of the mesa structure has many orientations. When the semiconductor layer is grown on the side surface of the mesa structure of the semiconductor device, abnormal growth may occur due to differences in growth rate attributable to orientation. Due to the abnormal growth, protruding portions are formed on a top surface of the semiconductor layer. Moreover, after growing the semiconductor layer on the side surface of the mesa structure, an electrode and a wire to be connected to the semiconductor device are formed on the semiconductor layer. In this case, disconnections of the electrode and the wire may occur at the protruding portions of the semiconductor layer which is grown on the side surface of the mesa structure, A method for manufacturing a waveguide-type semiconductor device according to the present invention includes the steps of: (a) preparing a wafer having a plurality of device sections that each include a first area, a second area, and a third area arranged in a direction of a waveguide axis; (b) forming an epitaxial structure on a main surface of the wafer, the epitaxial structure including a waveguide mesa disposed on the first area and a device mesa disposed on the second area, the device mesa having a side surface extending in a direction of the waveguide axis and an end surface extending in a direction orthogonal to the waveguide axis; (c) forming a mask for selective growth on the epitaxial structure; (d) growing a semiconductor region on the side surface and the end surface of the device mesa by using the mask for selective growth, the semiconductor region grown on the end surface of the device mesa including a side portion having a layer shape and a protruding wall portion protruding from the side portion in a direction perpendicular to a top surface of the device mesa; (e) forming an ohmic electrode on the top surface of the device mesa after forming the semiconductor region; (f) forming a resin layer on the device mesa and the semiconductor region, the resin layer covering the protruding wall portion after forming the ohmic electrode; (g) forming a resin mask having a first opening located on the ohmic electrode and a second opening located on the third area; (h) forming an electric conductor that includes a first conductive portion disposed in the first opening and connected to the ohmic electrode, a second conductive portion disposed in the second opening and supported on the third area, and a third conductive portion that extends from the first conductive portion to the second conductive portion, the third conductive portion passing over the protruding wall portion while making contact with a surface of the resin mask; and (i) removing the resin mask after forming the electric conductor.

According to the method for manufacturing a waveguide-type semiconductor device, an epitaxial structure is formed in each of the device sections on a main surface of a wafer. The epitaxial structure includes a waveguide mesa disposed on the first area and a device mesa disposed on the second area. A semiconductor region is grown on the side surface and the end surface of the device mesa by using the mask for selective growth. The semiconductor region grown on the end surface of the device mesa includes a side portion having a layer shape and a protruding wall portion protruding from the side portion in a direction perpendicular to a top surface of the device mesa. The height of the protruding wall portions in the device sections each varies within the wafer. In the subsequent step, an ohmic electrode is formed on the top surface of the device mesa. Moreover, an electric conductor is connected to the ohmic electrode. However, during formation of the electric conductor, failures such as disconnection of the electric conductor occur due to the protruding wall portion formed in the semiconductor region. Moreover, since the height of the wall-shaped protrusions in the device sections is not uniform, it is difficult to avoid disconnection of the electric conductor. Therefore, a yield of waveguide-type semiconductor devices decreases due to this disconnection of the electric conductor. As described above, the height of the protruding wall portions has a distribution within the wafer. This distribution varies wafer-to-wafer and lot-to-lot. In order to avoid the decrease in the device yield caused by disconnection of the electric conductor, the electric conductor includes a first conductive portion connected to the ohmic electrode, a second conductive portion supported on the third area, and a third conductive portion that extends from the first conductive portion to the second conductive portion. In addition, in the step of forming the electric conductor, the third conductive portion of the electric conductor passes over the protruding wall portion while making contact with a surface of the resin mask. Furthermore, the resin mask is removed after forming the electric conductor.

In the method for manufacturing a waveguide-type semiconductor device according to the present invention, the protruding wall portion of the semiconductor region may be higher than the top surface of the device mesa. In the step of removing the resin mask, the electric conductor extends over the protruding wall portion with a predetermined distance between the electric conductor and the protruding wall portion. According to this structure of the electric conductor, a stable electrical connection is achieved since the electric conductor extends over the protruding wall portion with the predetermined distance between the electric conductor and the protruding wall portion.

In the method for manufacturing a waveguide-type semiconductor device according to the present invention, the protruding wall portion in a first device section among the plurality of device sections may have a height different from a height of the protruding wall portion in a second device section among the plurality of device sections.

In this case, the height of the protruding wall portion in the first device section is different from the height of the protruding portion in the second device section. However, the resin mask is formed to cover the highest protruding wall portion in the device sections even when the height of the protruding wall portions varies in the wafer. Accordingly, the electric conductor in each device section may extend to pass over the protruding wall portion with a predetermined distance from the protruding wall portion even when there is a distribution in height of the protruding wall portions.

The method for manufacturing a waveguide-type semiconductor device according to the present invention may further include a step of forming a device isolation mesa on the first area and the second area of the device section after growing the semiconductor region. The device isolation mesa may be disposed around the device mesa. The third area may be located outside the device isolation mesa. In addition, the electric conductor may be connected to the ohmic electrode from the third area while passing over the device isolation mesa and the protruding wall portion.

According to the method for manufacturing a waveguide-type semiconductor device, a device isolation mesa is formed on the second area in the device section. Here, the electric conductor passes over the device isolation mesa as well as the protruding wall portion and is connected to the ohmic electrode from the third area.

In the method for manufacturing a waveguide-type semiconductor device according to the present invention, the protruding wall portion may have a portion that bends toward an inner side from an edge of the top surface of the device mesa with respect to a reference surface that extends along the end surface of the device mesa, the reference surface being orthogonal to the top surface of the device mesa.

According to the method for manufacturing a waveguide-type semiconductor device, the protruding wall portion has a portion that bends toward an inner side of the top surface of the device mesa. in forming the electric conductor on the device mesa to be connected to the ohmic electrode, the electric conductor may become thin or the electric conductor may be locally disconnected at the bending portion of the protruding wall portion. However, in each of the device sections, the electric conductor extends over the protruding wall portion with the predetermined distance between the electric conductor and the protruding wall portion. Even when the protruding wall portion is formed, the influence of the protruding wall portion is avoided in forming the electric conductors.

In the method for manufacturing a waveguide-type semiconductor device according to the present invention, the step of forming an epitaxial structure preferably includes the steps of forming a semiconductor stack on the main surface of the wafer, the semiconductor stack including a first stacked semiconductor layer for forming the waveguide mesa and a second stacked semiconductor layer for forming the device mesa; forming an insulator mask on the semiconductor stack, the insulator mask including a first pattern for forming the waveguide mesa and a second pattern for forming the device mesa in each of the device sections; and forming the waveguide mesa and the device mesa in each of the device sections by etching the semiconductor stack by using the insulator mask. The mask for selective growth may include the insulator mask that is used for etching the semiconductor stack in the step of forming the waveguide mesa and the device mesa.

In the method for manufacturing a waveguide-type semiconductor device according to the present invention, the second stacked semiconductor layer preferably includes an optical absorption layer that constitutes a photodiode. The waveguide mesa is connected to the device mesa. The first stacked semiconductor layer appears at the end surface of the device mesa. The waveguide mesa reaches another end surface of the device mesa opposite to the end surface. In addition, the second stacked semiconductor layer appears at the side surfaces of the device mesa.

According to the method for manufacturing a waveguide-type semiconductor device, the second stacked semiconductor layer appears at the side surfaces of the device mesa and the semiconductor region covers the side surfaces of the device mesa. Thus, the semiconductor region may protect the side surfaces of the device mesa. Therefore, a leakage current at the side surfaces of the device mesa is reduced.

In the method for manufacturing a waveguide-type semiconductor device according to the present invention, preferably, the wafer is composed of a III-V group compound semiconductor. The main surface of the wafer includes a (100)-oriented surface or a surface inclined from the (100)-oriented surface by an off-angle of 0.09 degrees or less. In addition, the waveguide axis extends in a direction parallel to a [0-1-1] direction.

DESCRIPTION OF THE PREFERRED EMBODIMENTS

The findings of the present invention can be easily understood from the detailed description below that refers to the attached drawings that show illustrative examples of the invention. Referring now to the attached drawings, embodiments of a method for manufacturing a waveguide-type semiconductor device of the present invention and a waveguide-type semiconductor device of the present invention are described. Where applicable, the same components are denoted by the same reference symbols.

Figure 1:
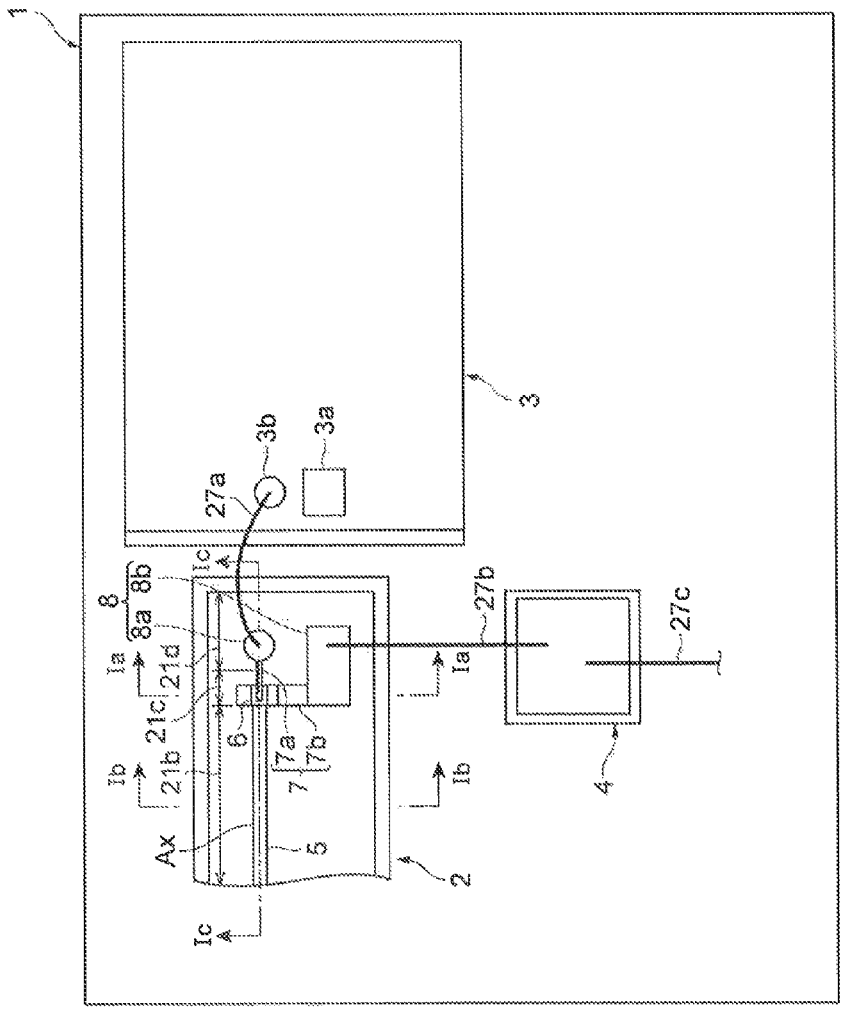
FIG. 1 is a diagram illustrating a photoreceptor that includes a waveguide-type semiconductor device according to one embodiment.

FIG. 1 is a drawing illustrating a photoreceiver that includes a waveguide-type semiconductor device according to one embodiment. As illustrated in FIG. 1, a photoreceiver 1 of this embodiment includes a waveguide-type semiconductor device 2, a signal amplifier 3, and a capacitor 4. The waveguide-type semiconductor device 2 includes a waveguide 5, a semiconductor device 6, electric conductors 7 (metal wiring layers 7a and 7b), and electrode pads 8 (8a and 8b). The waveguide 5, the semiconductor device 6, the electric conductors 7, and the electrode pads 8 are disposed on a substrate such as, for example, an InP substrate. The waveguide 5 extends along a waveguide axis Ax. The waveguide 5 includes a first cladding layer, a core layer, and a second cladding layer. The first cladding layer and the second cladding layer are composed of a material (for example, InP) that has a lower refractive index than the core layer. The core layer includes a material (for example, InGaAsP) that has a higher refractive index than the first cladding layer and the second cladding layer. In this embodiment, the semiconductor device 6 includes, for example, a light-receiving device and is thus referred to as the "light-receiving device 6" in the following description.

Figure 2A:
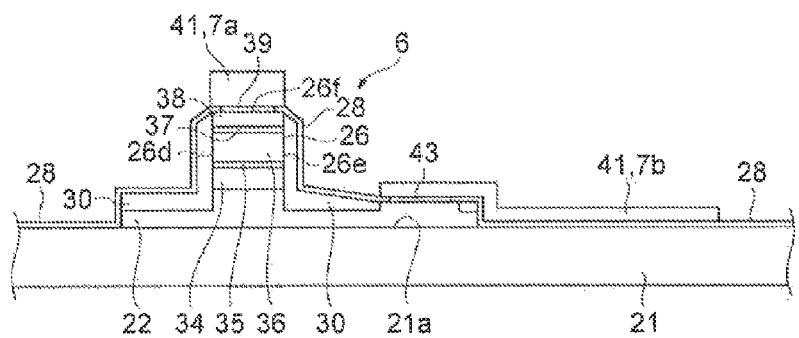
FIGS. 2A to 2C are each a cross-sectional view of a main section of the waveguide-type semiconductor device according to this embodiment.
Figure 2B:
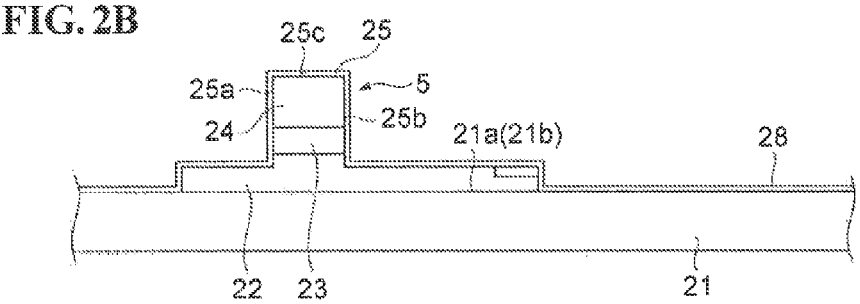
Figure 2C:
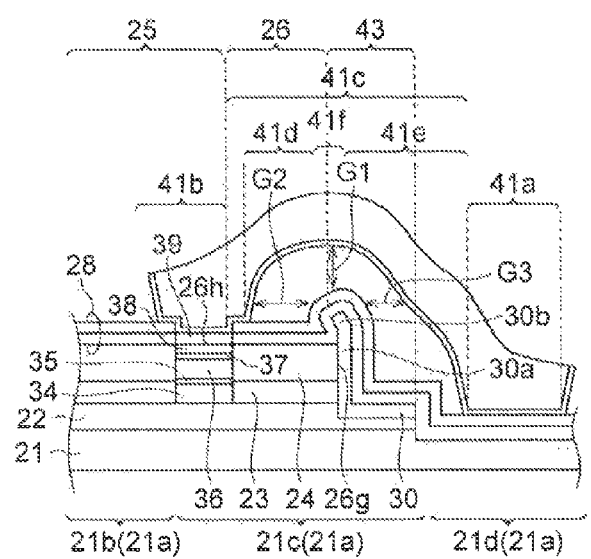

FIGS. 2A to 2C are each a cross-sectional view of a main section of the waveguide-type semiconductor device 2 according to this embodiment. FIG. 2A illustrates a cross-section taken along line Ia-Ia in FIG. 1. FIG. 2B illustrates a cross-section taken along line Ib-Ib in FIG. 1. FIG. 2C illustrates a cross-section taken along line Ic-Ic in FIG. 1.

The light-receiving device 6 includes, for example, a pin-type photodiode. The light-receiving device 6 is optically coupled to one end of the waveguide 5 that extends along the waveguide axis Ax. The light-receiving device 6 includes two electrodes that are a cathode and an anode. A bias voltage is supplied to the cathode of the light-receiving device 6. Upon receiving signal light propagating in the waveguide 5, the light-receiving device 6 generates an electrical signal (photocurrent) corresponding to the optical intensity of the signal light. The electrode pad 8a electrically connected to the anode of the light-receiving device 6 is disposed on the waveguide-type semiconductor device 2. The electrode pad 8a is provided to output electrical signals. The electrical signals are supplied to the signal amplifier 3. The electrode pad 8a is electrically connected to a signal input electrode pad 3b of the signal amplifier 3 via a bonding wire 27a.

The signal amplifier 3 includes an amplifier 3a configured to amplify an electrical signal output from the light-receiving device 6. The amplifier 3a may include, for example, a preamplifier. The signal amplifier 3 includes the signal input electrode pad 3b. The signal amplifier 3 amplifies the electrical signal received at the signal input electrode pad 3b and generates a voltage signal. The signal input electrode pad 3b is electrically connected to the electrode pad 8a via the bonding wire 27a.

The capacitor 4 is arranged by the side of the semiconductor device 2. The capacitor 4 is electrically connected between the cathode of the light-receiving device 6 and a reference potential line (for example, GND line). The semiconductor device 2 includes the electrode pad 8b. The electrode pad 8b is electrically connected to the cathode of the light-receiving device 6 so as to enable supply of bias voltage. The electrode pad 8b is also electrically connected to one electrode of the capacitor 4 via a bonding wire 27b. The other electrode of the capacitor 4 is electrically connected to a bias power source via a bonding wire 27c.

As illustrated in FIGS. 2A to 2C, the semiconductor device 2 includes a substrate 21. The substrate 21 is, for example, a semi-insulating InP substrate that is composed of Fe-doped InP. In the description below, the substrate 21 is referred to as the "in P substrate 21". The InP substrate 21 has a main surface 21a and the main surface 21a includes a (100)-oriented surface. The main surface 21a has a first area 21b, a second area 21c, and a third area 21d arranged in that order along the waveguide axis Ax. The semiconductor device 2 includes a waveguide mesa 25. In this embodiment, the direction of the optical waveguide axis corresponds to the [110] crystallographic direction of the InP substrate 21. The waveguide mesa 25 includes a stacked semiconductor layer for forming the waveguide 5 and this stacked semiconductor layer is disposed on the first area 21b of the InP substrate 21. A device mesa 26 includes a stacked semiconductor layer for forming the light-receiving device 6 and this stacked semiconductor layer is disposed on the second area 21c of the InP substrate 21. The device mesa 26 has a pair of side surfaces 26d and 26e extending in the direction of the waveguide axis Ax. The device mesa 26 has an end surface 26g that extends in a direction orthogonal to the waveguide axis Ax.

The waveguide 5 includes a buffer layer 22, a core layer 23, and a cladding layer 24. The buffer layer 22 is disposed on the first area 21b of the InP substrate 21. The core layer 23 is disposed on the buffer layer 22. The cladding layer 24 is disposed on the core layer 23. In this embodiment, the InP substrate 21 is composed of semi-insulating InP and the buffer layer 22 is composed of n-type InP. The core layer 23 includes a non-doped InGaAsP layer having a band gap wavelength of 1.05 μm. The cladding layer 24 is composed of non-doped InP. In the waveguide mesa 25, the waveguide 5 has an optical waveguide structure capable of confining light in the core layer 23 and propagating light through the core layer 23. A pair of side surfaces 25a and 25b and a top surface 25c of the waveguide mesa 25 in the waveguide 5 are covered with an insulating layer 28. The insulating layer 28 is composed of a dielectric material such as SiN, SiON, or SiO$_2$.

The light-receiving device 6 includes the n-type buffer layer 22, an i-type (non-doped) optical absorption layer 34, an i- or p-type heterostructure barrier buffer layer 35, a p-type cladding layer 36, a p-type heterostructure barrier buffer layer 37, and a p-type contact layer 38. The n-type buffer layer 22, the optical absorption layer 34, the i- or p-type heterostructure barrier buffer layer 35, the p-type cladding layer 36, the p-type heterostructure barrier buffer layer 37, and the p-type contact layer 38 are sequentially arranged on the main surface 21a of the InP substrate 21. The n-type buffer layer 22 is common to the light-receiving device 6 and the waveguide 5. In this embodiment, the optical absorption layer 34 is composed of non-doped InGaAs. The i- or p-type heterostructure barrier buffer layer 35 has a superlattice structure composed of non-doped or Zn-doped InGaAsP, for example. The superlattice structure is a structure in which InGaAsP layers of different compositions are alternately stacked. The band gap wavelengths of the InGaAsP layers constituting the superlattice are, for example, 1.3 μm and 1.1 μm, respectively. The p-type cladding layer 36 is composed of, for example, Zn-doped InP. The p-type heterostructure barrier buffer layer 37 has a superlattice structure in which Zn-doped InGaAsP layers having different compositions are alternately stacked, for example. The band gap wavelengths of the InGaAsP layers constituting the superlattice structure of the p-type heterostructure barrier buffer layer 37 are, for example, 1.3 μm and 1.1 μm, respectively. The p-type contact layer 38 is composed of Zn-doped InGaAs, for example.

A portion of the n-type buffer layer 22, the optical absorption layer 34, the i- or p-type heterostructure barrier buffer layer 35, the p-type cladding layer 36, the p-type heterostructure barrier buffer layer 37, and the p-type contact layer 38 constitute the device mesa 26. One end of the optical absorption layer 34 and one end of the i- or p-type heterostructure barrier buffer layer 35 in the waveguiding direction are in contact with the core layer 23 of the waveguide 5. As a result, the optical absorption layer 34 is optically coupled to the core layer 23. The side surfaces 26d and 26e of the device mesa 26 in the light-receiving device 6 are buried with a semiconductor buried region 30 composed of a semi-insulating material, e.g., Fe-doped InP. In addition, the end surface 26g of the device mesa 26 in the light-receiving device 6 is buried with the semiconductor buried region 30.

The light-receiving device 6 further includes the insulating layer 28. The insulating layer 28 is also common to the light-receiving device 6 and the waveguide 5. The insulating layer 28 is disposed on the top surface 26f of the device mesa 26 and the semiconductor buried region 30 formed on the side surfaces 26d and 26e and the end surface 26g of the device mesa 26. The insulating layer 28 has an opening (first opening) located on a top surface 26f of the device mesa 26 in the light-receiving device 6. A p-side ohmic electrode 39 makes contact with the p-type contact layer 38 through this first opening of the insulating layer 28. The p-side ohmic electrode 39 is composed of, for example, AuZn or Pt. The metal wiring layer 7a is disposed on the p-side ohmic electrode 39. The metal wiring layer 7a extends in the direction of the waveguide axis Ax upwardly away from the end surface 26g of the device mesa 26 and electrically connects the p-side ohmic electrode 39 and the electrode pad 8a to each other. In this embodiment, the metal wiring layer 7a has a stacked structure such as TiW/Au or Ti/Pt/Au, for example. The electrode pad 8a includes, for example, a Au plating layer.

In the first area 21b and the second area 21c, a device isolation mesa is disposed around the waveguide mesa 25 and the device mesa 26. An n-side ohmic electrode 43 is disposed on the device isolation mesa. The device isolation mesa extends from an edge of the bottom of the device mesa 26 of the light-receiving device 6. The insulating layer 28 has another opening (second opening) on the n-type buffer layer 22 of the device isolation mesa. The surface of the n-type buffer layer 22 is exposed through this second opening of the insulating layer 28. The n-side ohmic electrode 43 makes contact with the n-type buffer layer 22 also through this second opening. The n-side ohmic electrode 43 is composed of, for example, AuGe or AuGeNi. The metal wiring layer 7b is disposed on the n-side ohmic electrode 43. The metal wiring layer 7b makes contact with the n-side ohmic electrode 43 and extends over the insulating layer 28 to electrically connect the n-side ohmic electrode 43 and the electrode pad 8b to each other. The metal wiring layer 7b has, for example, a stacked structure such as TiW/Au or Ti/Pt/Au. The electrode pad 8b includes, for example, a Au plating layer.

A stacked semiconductor layer having the same layer structure as the waveguide mesa 25 is formed at the end surface 26g of the device mesa 26 but a stacked semiconductor layer for the light-receiving device 6 is not provided at the end surface 26g. Accordingly, the end surface 26g includes a side end of the n-type buffer layer 22, a side end of the core layer 23, and a side end of the cladding layer 24. In contrast, a side surface of a stacked semiconductor layer for the light-receiving device 6 is exposed at the side surfaces 26d and 26e of the device mesa 26. The end surface 26g and the side surfaces 26d and 26e of the device mesa 26 are buried with the semiconductor buried region 30. The insulating layer 28 is disposed on the top surface 25c and side surfaces 25a and 25b of the waveguide mesa 25. in addition, the insulating layer 28 is disposed on the top surface 26f of the device mesa 26 and on the semiconductor buried region 30 formed on the end surface 26g and the side surfaces 26d and 26e.

As shown in FIG. 2C, an electric conductor 41 that constitutes the metal wiring layer 7a includes a first conducting portion 41a, a second conducting portion 41b, and a third conducting portion 41c. The third area 21d of the InP substrate 21 supports the first conducting portion 41a of the electric conductor 41. The p-side ohmic electrode 39 supports the second conducting portion 41b of the electric conductor 41. The third conducting portion 41c connects the first conducting portion 41a and the second conducting portion 41b to each other. The third conducting portion 41c includes a first portion 41d, a second portion 41e, and a third portion 41f. The first portion 41d of the third conducting portion 41e is a portion near the second conducting portion 41b supported on the p-side ohmic electrode 39 and extends in a direction away from the main surface 21a of the InP substrate (wafer) 21. The second portion 41e is a portion that extends from the first conducting portion 41a supported on the third area 21d and extends in a direction away from the main surface 21a of the InP substrate (wafer) 21. The third portion 41f is located between the first portion 41d and the second portion 41e and is a portion most remote from the main surface 21a of the InP substrate (wafer) 21. The first portion 41d and the second portion 41e of the electric conductor 41 are connected to each other via the third portion 41f.

The semiconductor buried region 30 formed on the end surface 26g includes a semiconductor region constituted by a side portion 30a and a protruding wall portion 30b. The side portion 30a is grown on the end surface 26g of the device mesa 26 and has a layer shape. The protruding wall portion 30b is higher than a top surface 26h of the device mesa 26. The protruding wall portion 30b protrudes from the side portion 30a in a direction perpendicular to the top surface 26h. The third conducting portion 41c of the electric conductor 41 connects the first conducting portion 41a and the second conducting portion 41b to each other so as to pass over the protruding wall portion 30b with a predetermined distance between the protruding wall portion 30b and the third conducting portion 41c. The distance (distance in the direction perpendicular to the top surface 26h) between the third conducting portion 41c and the highest point of the insulating layer 28 on the protruding wall portion 30b is defined as G1. The distance between the insulating layer 28 on the protruding wall portion 30b and the second conducting portion 41b or the first portion 41d of the third conducting portion 41c is defined as G2 in a direction parallel to the top surface 26h. The distance between the insulating layer 28 on the protruding wall portion 30b and the second portion 41e of the third conducting portion 41c is defined as G3 in a direction parallel to the top surface 26h.

FIGS. 1 and 2A to 2C illustrate a semiconductor chip fabricated in one of the device sections in a wafer. The height of the protruding wall portion 30b of this semiconductor chip is different from the height of the protruding wall portion 30b of a semiconductor chip fabricated in a different device section. The height of the protruding wall portion 30b changes within a wafer. In addition, the height of the protruding wall portion 30b is not replicable. In such cases also, the electric conductor 41 in each of such semiconductor chips (device sections) spans across the protruding wall portion 30b with a distance between the protruding wall portion 30b and the electric conductor 41. Therefore, even when the height of the protruding wall portions 30b varies within the wafer or among the chips in the wafer, disconnection of the electric conductor 41 and the like can be avoided. The protruding wall portion 30b has a portion that bends inward from the edge of the top surface 26f of the device mesa 26 with respect to a reference surface. Here, the reference surface is defined as a surface that extends along the end surface 26g of the device mesa 26 and is orthogonal to the top surface 26h of the device mesa 26. When a metal wiring is formed on the protruding wall portion 30b, disconnection of the metal wiring occurs in this portion bent toward the inner side of the top surface 26f, for example. In particular, when a metal for forming metal wiring is formed on the device mesa 26, the metal layer at the recessed portion adjacent to the protruding wall portion 30b has a thickness thinner than that of the metal layer formed on the flat surface. In some cases, the metal layer is not formed under the portion bent toward the inner side of the top surface 26f. Therefore, disconnection of the metal wiring occurs during the process of forming the metal wiring. However, in this embodiment, the electric conductor 41 in each of the semiconductor chips extends so as to span across the protruding wall portion 30b with a distance between the electric conductor 41 and the protruding wall portion 30b. Accordingly, even when the recessed portion is formed in the bend of the protruding wall portion 30b, the influence of the recessed portion can be avoided and metal wiring without disconnection is formed. Accordingly, semiconductor devices fabricated in respective device sections exhibit good electrical properties and high reliability.

Figure 3:
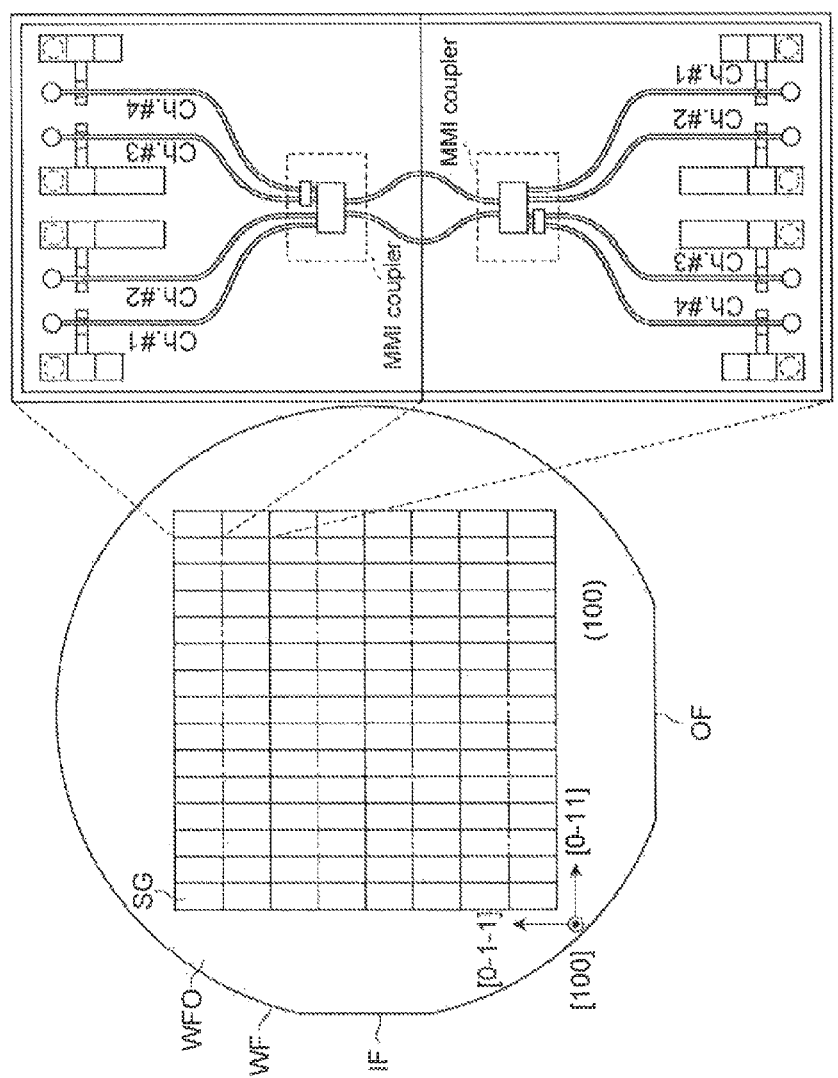
FIG. 3 is a diagram illustrating an array that includes plural device sections on a main surface of a wafer and a device structure of a semiconductor chip fabricated in each device section.

FIG. 3 is a diagram illustrating an array that includes plural device sections on a main surface of a wafer and a device structure of a semiconductor chip fabricated in each device section. A main surface WF0 of a wafer WF includes device sections SG arranged into an array. A semiconductor chip CP is fabricated in each device section SG. The wafer WF is composed of III-V group compound semiconductor such as InP. The wafer WF has an orientation flat (OF) and an identification flat (IF) in its periphery. An example of a wafer WF includes an orientation flat (OF) that has a side perpendicular to the [0-1-1] direction and an identification flat (IF) having a side perpendicular to the [0-11] direction. The main surface of the wafer WF includes a (100)-oriented surface, or a surface inclined from the (100)-oriented surface by an off-angle of 0.09 degrees or less.

In this embodiment, each device section includes a 90 degree optical hybrid for a coherent mixer. The 90 degree optical hybrid is constituted by; for example, a multimode interference (MMI) coupler (for example, 2×4 MMI). Four photodiodes are connected to the output ports of the multimode interference coupler through respective waveguides. In this embodiment, the end surface 26g of the device mesa 26 extends in the [0-11] direction. In this embodiment, the side portion 30a having a layer shape and the protruding wall portion 30b extend in the [0-11] direction in each device mesa 26.

FIGS. 4A to 19B are diagrams illustrating major steps of a method for producing a III-V group compound semiconductor device. In the diagrams numbering of which is followed by capital letter A, a process cross section corresponding to a device cross section taken along line Ic-Ic in FIG. 1 is shown. in the diagrams numbering of which is followed by capital letter B, a process cross section corresponding to a device cross section taken along line Ia-Ia in FIG. 1 is shown. For better understanding, the reference symbols of semiconductor layers used in FIGS. 2A to 2C are also used in FIG. 4A to FIG. 19B.

Figure 4A:
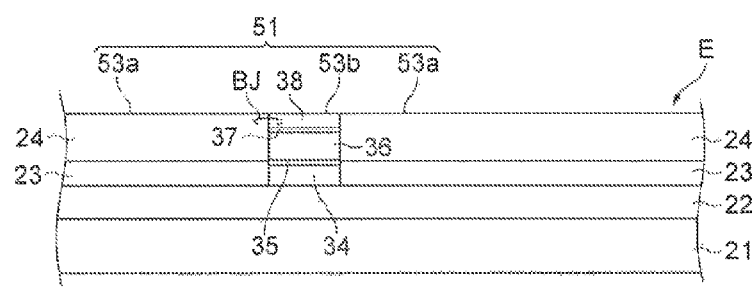
FIGS. 4A and 4B are diagrams showing one of the major steps of a method for manufacturing a waveguide-type semiconductor device.
Figure 4B:
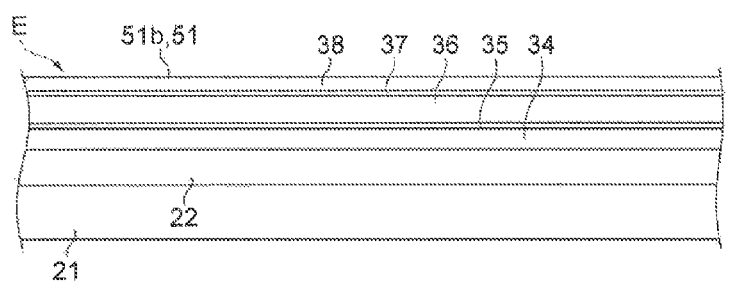

In step S101, as illustrated in FIGS. 4A and 4B, an epitaxial substrate E is prepared. in preparing the epitaxial substrate E, for example, a semiconductor stack 51 is grown on a main surface WF0 of a wafer WF. A metal-organic vapor phase epitaxy (MOVPE) method is employed to grow the semiconductor stack 51, for example. The semiconductor stack 51 includes a first stacked semiconductor layer 53a for forming a waveguide mesa and a second stacked semiconductor layer 53b for forming a device mesa. In this embodiment, the epitaxial substrate E includes the first stacked semiconductor layer 53a for forming a waveguide and the second stacked semiconductor layer 53b for forming a semiconductor device (for example, a photodiode). In the epitaxial substrate E, the first stacked semiconductor layer 53a and the second stacked semiconductor layer 53b form a butt-joint. As a result, the waveguide mesa and the device mesa are optically coupled through a butt joint structure BJ. The first stacked semiconductor layer 53a includes, for example, an n-type buffer layer 22, a non-doped core layer 23, and a non-doped cladding layer 24. The second stacked semiconductor layer 53b includes, for example, the n-type buffer layer 22, a non-doped optical absorption layer 34, an i- or p-type heterostructure barrier buffer layer 35, a p-type cladding layer 36, a p-type heterostructure barrier buffer layer 37, and a p-type contact layer 38.

Figure 5A:
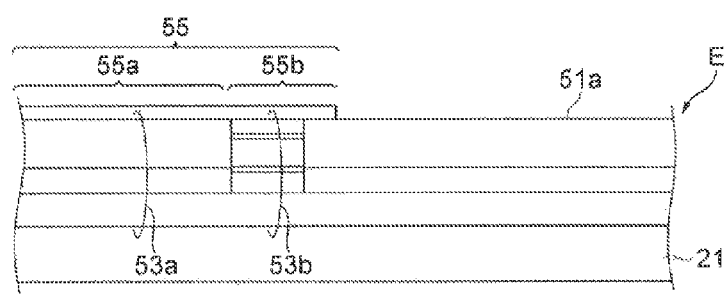
FIGS. 5A and 5B are diagrams showing one of the major steps of a method for manufacturing a waveguide-type semiconductor device.
Figure 5B:
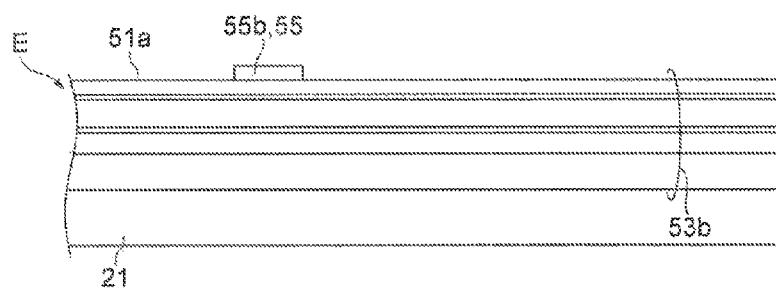

In step S102, as illustrated in FIGS. 5A and 5B, an insulator mask 55 is formed on a main surface 51a of the semiconductor stack 51 of the epitaxial substrate E. The insulator mask 55 includes a first pattern 55a for forming a waveguide mesa and a second pattern 55b for forming a device mesa. The first pattern 55a and the second pattern 55b are formed in each device section. The insulator mask 55 is formed of a dielectric film of SiN, SiON, SiO$_2$, or the like, for example. Photolithography and etching are employed in forming the insulator mask 55, for example.

Figure 6A:
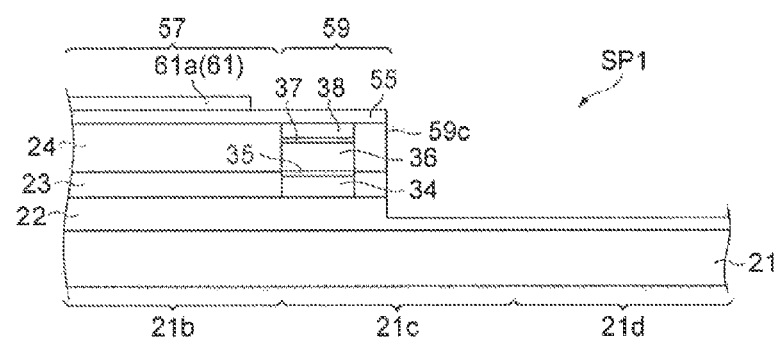
FIGS. 6A and 6B are diagrams showing one of the major steps of a method for manufacturing a waveguide-type semiconductor device.
Figure 6B:
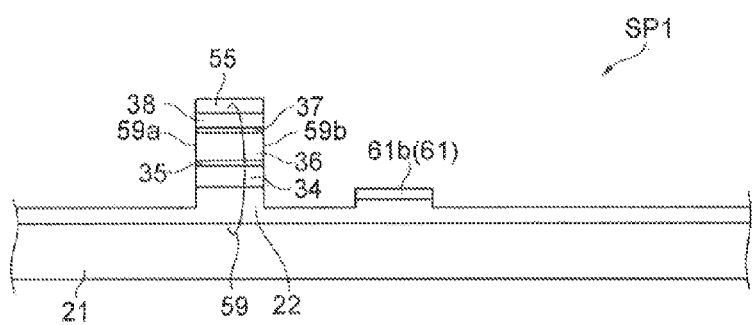

In step S103, as illustrated in FIGS. 6A and 6B, the semiconductor stack 51 of the epitaxial substrate E is etched to a middle of the n-type buffer layer 22 by using the insulator mask 55 so as to make an epitaxial structure SP1. As a result of etching, an epitaxial structure SP1 that includes a waveguide mesa 57 and a device mesa 59 is formed in each device section SG. Side surfaces of the waveguide mesa 57 and the device mesa 59 and a top surface of the n-type buffer layer 22 are exposed through the insulator mask 55. Upon completion of etching, the insulator mask 55 for forming a mesa remains on the epitaxial structure SP1. The device mesa 59 has a pair of side surfaces 59a and 59b that extend in the direction of the waveguide axis Ax. In the embodiment, the direction of the waveguide axis Ax corresponds to the [0-1-1] direction. An end surface 59c of the device mesa 59 extends in a direction orthogonal to the direction of the waveguide axis Ax.

In step S104, as illustrated in FIGS. 6A and 6B, an insulator mask 61 for selective growth is formed on the epitaxial structure SP1. As a result of performing this step, a substrate product SP2 is formed. The insulator mask 61 includes a first pattern 61a disposed on side surfaces and a top surface of the waveguide mesa 57 and a second pattern 61b covering a top surface of the n-type buffer layer 22 in an area on which the n-side ohmic electrode is to be formed. The insulator mask 61 is not formed on side surfaces and a top surface of the device mesa 59. Accordingly, the side surfaces 59a and 59b of the device mesa 59 remain exposed. A top surface 21e of the n-type buffer layer 22 on the second area 21c and third area 21d of the substrate 21 is also exposed through the masks 55 and 61. The insulator mask 61 is formed of a dielectric film composed of, for example, SiN, SiON, SiO$_2$, or the like. Photolithography and etching are employed to form the insulator mask 61, for example. If needed, the side surfaces of the device mesa 59 is etched by wet-etching using the insulator mask 55 and the insulator mask 61 in order to remove the surface damage incurred by dry-etching for forming a mesa. The insulator mask 55 and the insulator mask 61 are used as a mask for selective growth.

Figure 7A:
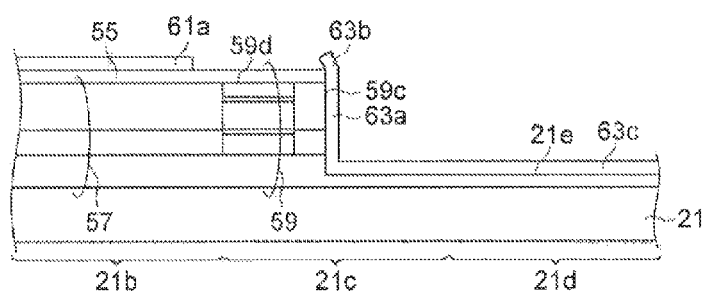
FIGS. 7A and 7B are diagrams showing one of the major steps of a method for manufacturing a waveguide-type semiconductor device.
Figure 7B:
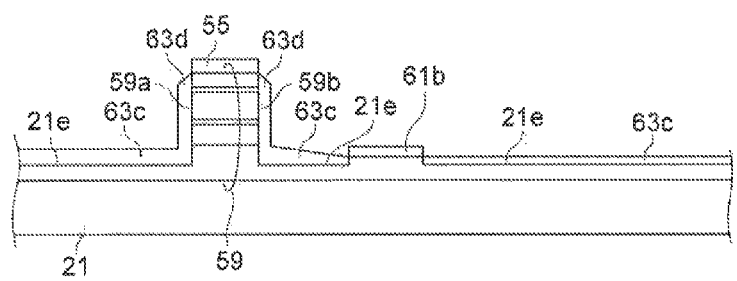

In step S105, as illustrated in FIGS. 7A and 7B, the substrate product SP2 is placed in a growth chamber of, for example, a MOVPE reactor Raw materials are then supplied to the growth chamber to grow a semiconductor region 63 on the substrate product SP2 by using the masks 55 and 61. A substrate product SP2 is formed in each of the device sections SG arranged into an array on the main surface WF0 of the wafer WF and includes an epitaxial structure SP1 and masks (the masks 55 and 61) for selective growth. The epitaxial structure SP1 includes the waveguide mesa 57 in a first area 21b of the device section SG and the device mesa 59 in a second area 21c of the device area SG. The masks for selective growth that are composed of the masks 55 and 61 are formed on the epitaxial structure SP1.

The semiconductor region 63 includes a side portion 63a having a layer shape, a protruding wall portion 63b, a layer portion 63c, and a side portion 63d having a layer shape. The side portion 63a is a portion grown on the end surface 59c of the device mesa 59. The protruding wall portion 63b is a portion higher than a top surface 59d of the device mesa 59. The protruding wall portion 63b protrudes from the side portion 63a in a direction perpendicular to the top surface 59d. The layer portion 63c is a portion grown on the substrate 21 uncovered with the masks for selective growth that are composed of the masks 55 and 61. In the embodiment, the layer portion 63c is a portion grown on the top surface 21e of the n-type buffer layer 22 uncovered with the masks for selective growth. The semiconductor region 63 is also grown on the side surfaces 59a and 59b of the device mesa 59 that are not covered with the masks for selective growth so as to form the side portion 63d having a layer shape. It should be noted that the semiconductor region 63 is not grown on the side surfaces and top surface of the waveguide mesa 57, the top surface of the n-type buffer layer 22 in the area on which the n-side ohmic electrode is to be formed, and the top surface of the device mesa 59 that are covered with the masks for selective growth. The wafer WF has a main surface having a predetermined surface orientation. In the embodiment, the main surface includes a (100)-oriented surface. The main surface may have a slightly inclined surface orientation with respect to the (100)-oriented surface by an off-angle within the range of 0.09 degrees or less. When the main surface of the wafer WF has the inclined surface orientation within this angle range from the (100)-oriented surface, growth of the protruding wall portion 63b becomes significant.

In the step of growing the semiconductor region 63, source gases for growing InP are supplied to the growth chamber. The semiconductor region 63 made of InP is grown on the side surfaces 59a and 59b and the end surface 59e of the device mesa 59. The semiconductor region 63 functions as a protective film that protects the side surfaces 59a and 59b and the end surface 59c of the device mesa 59. Therefore, a leakage current at the side surfaces 59a and 59b and the end surface 59e of the device mesa 59 is reduced. A semiconductor layer made of InP is grown on the side surfaces 59a and 59b so as to form the side portion 63d having a layer shape. However, during the growth of the semiconductor region 63, a semiconductor layer grown on the end surface 59c of the device mesa 59 has a protruding wall that protrudes from the edge of the top surface 59d in an upward direction with respect to the top surface 59d of the device mesa 59 because the growth rate of the semiconductor layer depends on the surface orientation of the base layer on which the semiconductor is to be grown.

In one embodiment, the device mesa 59 has a pair of side surfaces 59a and 59b that extend in the direction of the optical waveguide axis 26 that corresponds to the [0-1-1] direction. Here, the end surface 59c of the device mesa 59 extends in the direction orthogonal to the waveguide axis Ax that is the [0-11] direction. Therefore, the side surfaces 59a and 59b have a surface orientation different from that of the end surface 59c. In the embodiment, the side surfaces 59a and 59b mainly have a (0-11)-oriented surface. The end surface 59e mainly has a (0-1-1)-oriented surface. In such an embodiment, growth of the protruding wall portion 63b is significant.

The device mesa 59 includes, for example, an optical absorption layer of a photodiode. The device mesa 59 is optically and physically connected to the waveguide mesa 57. Accordingly, an end surface of the first layered semiconductor layer constituting the waveguide mesa 57 appears at the end surface 59c of the device mesa 59. In other words, the waveguide mesa 57 reaches the end surface of the device mesa 59 opposite to the end surface 59c. Side surfaces of the second stacked semiconductor layer constituting the device mesa 59 appear at the side surfaces 59a and 59b of the device mesa 59. The side surfaces 59a and 59b are covered with the side portion 63d of the semiconductor region 63. The side portion 63a of the semiconductor region 63 covers the end surface 59c of the device mesa 59. Thus, the side portion 63a and the side portion 63d of the semiconductor region 63 protect the end surface 59c and the side surfaces 59a and 59b of the device mesa 59, respectively.

After the growth of the semiconductor region 63, the masks for selective growth (masks 55 and 61) are removed. When the masks for selective growth are composed of SiN, the masks are removed by using hydrofluoric acid (HF), for example.

Figure 8A:
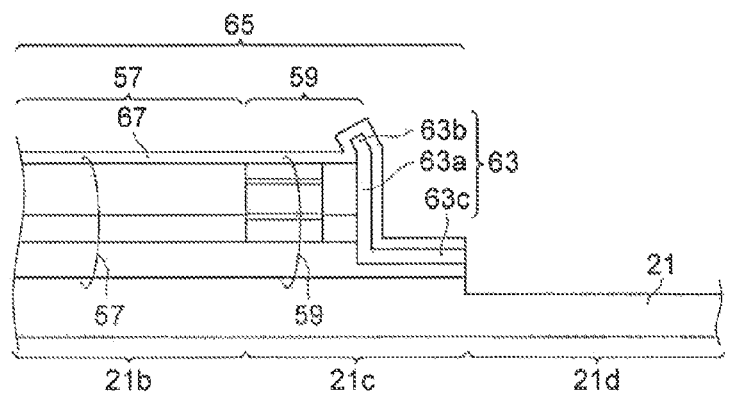
FIGS. 8A and 8B are diagrams showing one of the major steps of a method for manufacturing a waveguide-type semiconductor device.
Figure 8B:
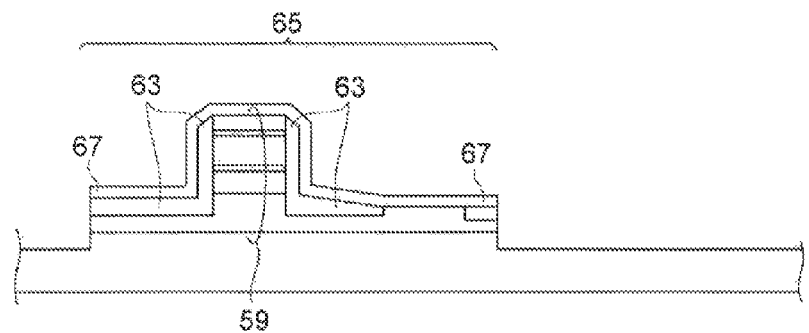

In step S106, as illustrated in FIGS. 8A and 8B, a device isolation mesa 65 is formed. The device isolation mesa 65 is formed in the first area 21b and the second area 21c. Since the waveguide mesa 57 is connected to the device mesa 59, the edge of the device isolation mesa 65 is formed at a position remote from the lower ends of these mesas by a predetermined distance (for example, 3 μm or more). In this manner, the waveguide mesa 57 and the device mesa 59 are electrically separated from other waveguide mesas 57 and device mesas 59 on the substrate 21. In order to electrically isolate the mesas, the semiconductor region 63 and the n-type buffer layer 22 around the waveguide mesa 57 and the device mesa 59 are etched to expose the substrate 21.

The device isolation mesa 65 is formed as follows. After the growth of the semiconductor region 63, an insulator mask 67 covering a region where the device isolation mesa 65 is to be formed is formed. The insulator mask 67 is made of, for example, SiN, SiON, or $SiO_2$. The semiconductor region 63 and the n-type buffer layer 22 are etched by using the insulator mask 67 so as to expose the substrate 21. As a result, a device isolation region is formed. The device isolation mesas 65 are not connected to one another through a conductive semiconductor layer, for example, the n-type buffer layer 22. After the device isolation mesa 65 is formed, the insulator mask 67 is removed. When the insulator mask 67 is composed of SiN, the insulator mask 67 is removed by using buffered hydrofluoric acid (BHF), for example.

Figure 9A:
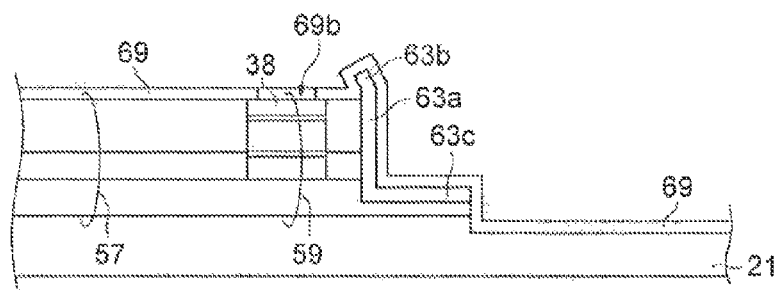
FIGS. 9A and 9B are diagrams showing one of the major steps of a method for manufacturing a waveguide-type semiconductor device.
Figure 9B:
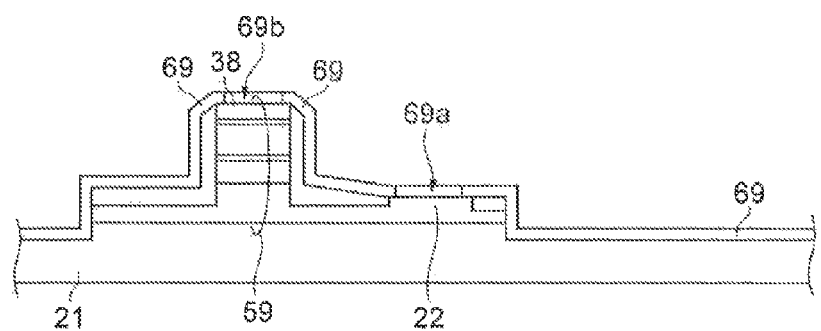

In step S107, as illustrated in FIGS. 9A and 9B, an insulating layer 69 is formed on the entire surface of the substrate 21 after the device isolation mesa 65 is formed. The insulating layer 69 is formed of a dielectric film composed of SiN, SiON, $SiO_2$, or the like. The insulating layer 69 covers the side surfaces and the top surface of the waveguide mesa 57. In addition, the insulating layer 69 covers the side surfaces of the semiconductor region 63 formed on the end surface 59c and the side surfaces 59a and 59b of the device mesa 59. The insulating layer 69 covers the top surface of the device mesa 59. Furthermore, the insulating layer 69 covers the surface of the device isolation mesa 65 and the surface of the third area 21d (device isolation region) located outside the device isolation mesa 65. In particular, the insulating layer 69 is formed on the side portion 63a having a layer shape, the protruding wall portion 63b, and the layer portion 63c of the semiconductor region 63. The insulating layer 69 continuously extends from the surface of the side portion 63a to the surfaces of the device mesa 59 and the waveguide mesa 57 via the protruding wall portion 63b.

In step S108, as illustrated in FIGS. 9A and 9B, an opening 69a is formed in the insulating layer 69 on the surface of the device isolation mesa 65 by photolithography and etching. Another opening 69b is formed in the insulating layer 69 on the device mesa 59. The n-type buffer layer 22 is exposed through the opening 69a of the insulating layer 69 on the device isolation mesa 65. The p-type contact layer 38 is exposed through the opening 69b of the insulating layer 69 on the top surface of the device mesa 59.

Figure 10A:
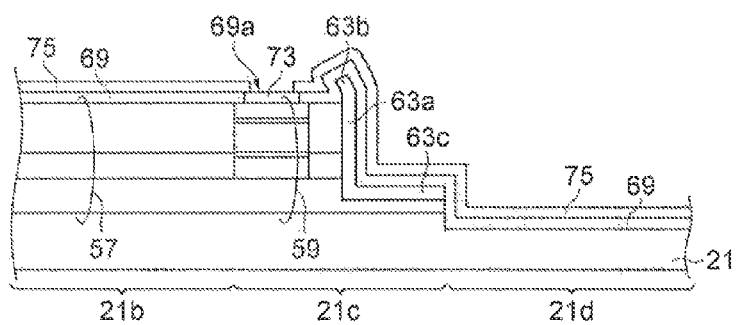
FIGS. 10A and 10B are diagrams showing one of the major steps of a method for manufacturing a waveguide-type semiconductor device.
Figure 10B:
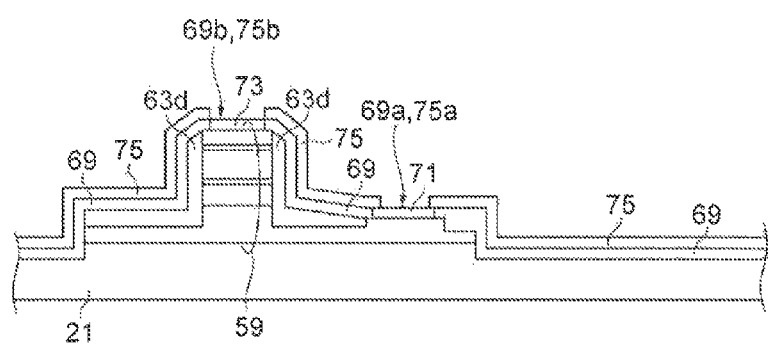

After the openings 69a and 69b are formed in the insulating layer 69, as illustrated in FIGS. 10A and 10B, an n-side ohmic electrode 71 is formed in the opening 69a. The n-side ohmic electrode 71 contacts the n-type buffer layer 22 of the device isolation mesa 65 through the opening 69a. A p-side ohmic electrode 73 is also formed in the opening 69b. The p-side ohmic electrode 73 contacts the p-type contact layer 38 of the device mesa 59 through the opening 69b. After the n-side ohmic electrode 71 and the p-side ohmic electrode 73 are formed, an insulating layer 75 for constituting a capacitor is formed on the entire surface of the substrate 21, if needed. The insulating layer 75 is formed of a dielectric film composed of SiN, SiON, $SiO_2$, or the like, for example. An opening 75a that aligns with the n-side ohmic electrode 71 on the device isolation mesa 65 is formed in the insulating layer 75. An opening 75b that aligns with the p-side ohmic electrode 73 on the device mesa 59 is formed in the insulating layer 75.

Next, an example of forming an electrode is described.

Figure 11A:
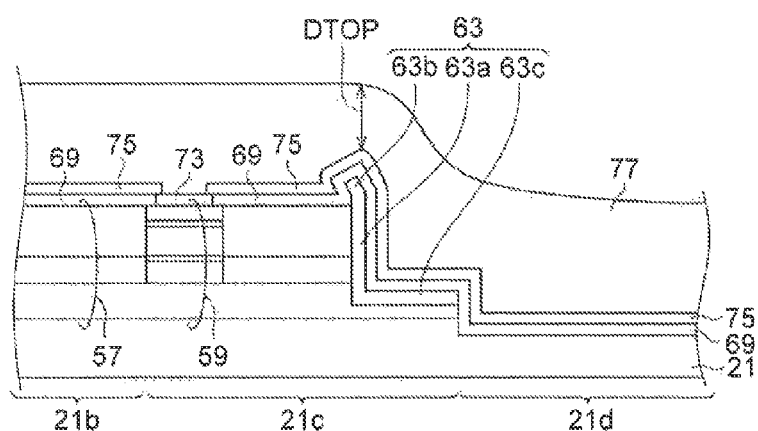
FIGS. 11A and 11B are diagrams showing one of the major steps of a method for manufacturing a waveguide-type semiconductor device.
Figure 11B:
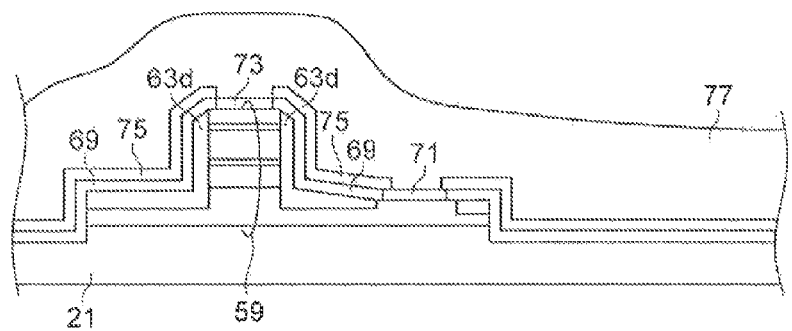

In step S109, as illustrated in FIGS. 11A and 11B, after the n-side ohmic electrode 71 and the p-side ohmic electrode 73 are formed, a resin layer 77 is formed so that the resin layer 77 covers the protruding wall portion 63b of the semiconductor region 63. The resin layer 77 is composed of, for example, a photosensitive resist. The thickness of the resin layer 77 is about 2 μm to 5 μm, for example. The resin layer 77 is formed to cover semiconductor structures on the first area 21b, the second area 21c, and the third area 21d of the substrate 21. In particular, the resin layer 77 is formed on the insulating layer 69 (or the insulating layer 75 if it is formed) that covers the surface of the protruding wall portion 63b. Since the height of the protruding wall portion 63b varies among device sections in the wafer WF, the resin layer 77 is formed so as to cover the highest protruding wall portion 63b among all device sections in the wafer WF. The maximum height of the protruding wall portion 63b may be estimated by measuring the distribution of the height of the protruding wall portion 63b among device sections in the wafer WF before forming the resin layer 77. The thickness of the resin layer 77 may be decided based on the result of a measurement of the distribution of the height of the protruding wall portion 63b in the wafer WF. As a result, all of the protruding wall portions 63b in the device sections in the wafer WF are covered with the resin layers 77. The thickness DTOP of the resin layer 77 on the protruding wall portion 63b is preferably 0.5 μm or more and 4 μm or less.

When the waveguide mesa 57 or the device mesa 59 has a height (step) of less than 5 μm, the step of the mesa and the protrusions may be covered by applying a resist having a thickness half the height of the mesa or more. For example, when the height of the mesa is 5 μm, the thickness of the resin is set to be 2.5 μm or more so as to cover the step of the mesa and the protrusions. As a result, the step of the mesa and the protrusions may be covered. Wiring that spans across the side portions 63a is easily formed despite height variation among the protruding wall portions 63b by adjusting the thickness of the resist. The height of the protruding wall portion 63b in the wafer surface is, for example, about 0.6 to 0.9 μm. The thickness of the resin layer 77 is, for example, about 2.9 to 3.1 μm so as to cover the protruding wall portions 63b in the device sections in the wafer WF. The thickness variation among the resin layers 77 may be made smaller than the height variation among the protruding wall portions 63b.

Figure 12A:
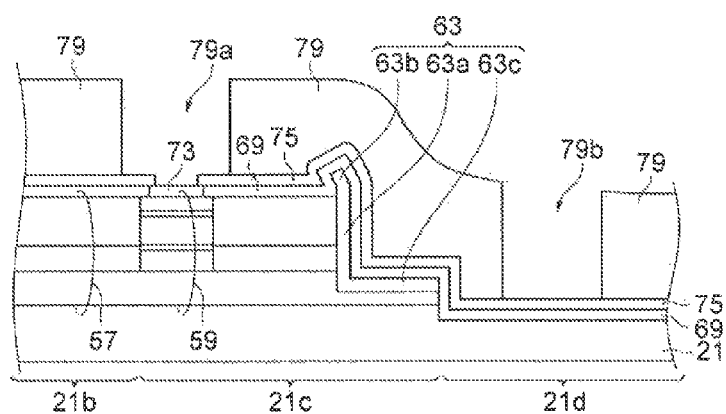
FIGS. 12A and 12B are diagrams showing one of the major steps of a method for manufacturing a waveguide-type semiconductor device.
Figure 12B:
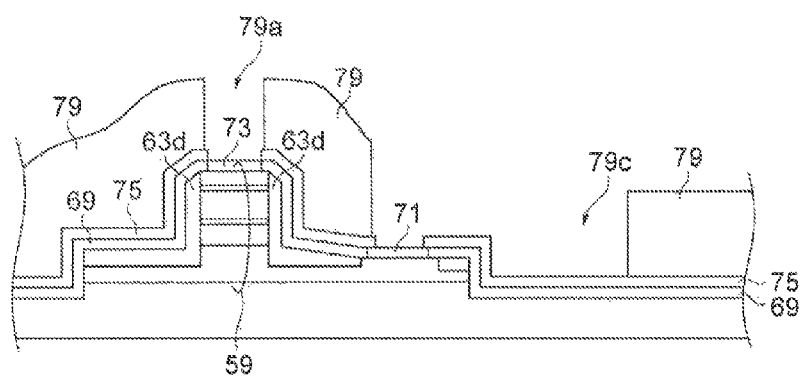

In step S110, as illustrated in FIGS. 12A, 12B, 13A, and 13B, a resin mask 79 is formed by processing the resin layer 77 using a photolithography method. The resin mask 79 defines openings of the resin layer 77. As illustrated in FIGS. 12A and 12B, the openings of the resin layer 77 include a first opening 79a located on the p-side ohmic electrode 73 on the device mesa 59, a second opening 79b located on the device isolation region, and a third opening 79c located on the n-side ohmic electrode 71 on the device isolation mesa 65. In the embodiment, the resin layer 77 is composed of a photosensitive resist. Therefore, by the exposure and development of the resin layer 77, the resin mask 79 is formed. In the embodiment, the device mesa 59 has a height of about 4 µm from the surface of the device isolation region. Similarly, the waveguide mesa 57 has a height of about 4 µm from the surface of the device isolation region. Accordingly, it is difficult to simultaneously adjust the focus on the first opening 79a, the second opening 79b, and the third opening 79c during exposure because a distance between the first opening 79a and the second opening 79b or a distance between the first opening 79a and the third opening 79c in a direction perpendicular to the surface of the substrate 21 is so large that substantially corresponds to the height of the device mesa 59. For example, during exposure, the focus is adjusted to resolve the pattern of the first opening 79a. Accordingly, the size of the second opening 79b and the third opening 79c deviates by about 1 µm from the size defined on the wafer by a pattern on a reticle.

As described above, the resin mask 79 has the first opening 79a located on the p-side ohmic electrode 73 on the device mesa 59, the second opening 79b located on the device isolation region in the third area 21d, and the third opening 79c located on the n-side ohmic electrode 71 on the device isolation mesa 65. The p-side ohmic electrode 73 is exposed through the first opening 79a to connect the wiring to the p-side ohmic electrode 73. The second opening 79b is used for forming the wiring from the p-side ohmic electrode 73 to a pad electrode. The n-side ohmic electrode 71 is exposed through the third opening 79c to connect the wiring to the n-side ohmic electrode 71. In addition, the third opening 79c is used for forming wiring from the n-side ohmic electrode 71 to a pad electrode. The first opening 79a, the second opening 79b, and the third opening 79c each have an area or size needed for the corresponding electric conductor. For example, the third opening 79c extends from the device isolation mesa 65 on the second area 21c to the device isolation region (area where the substrate 21 is exposed).

Figure 13A:
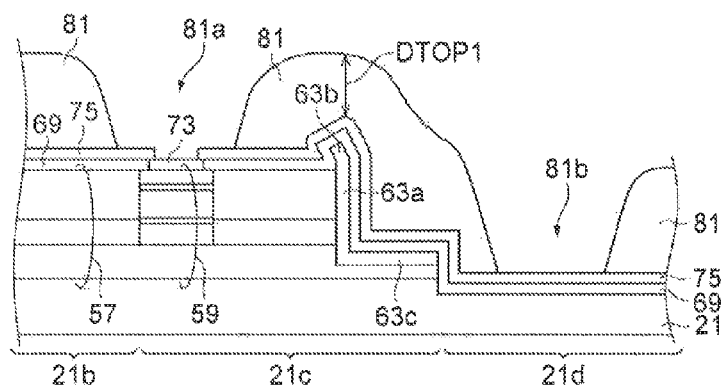
FIGS. 13A and 13B are diagrams showing one of the major steps of a method for manufacturing a waveguide-type semiconductor device.
Figure 13B:
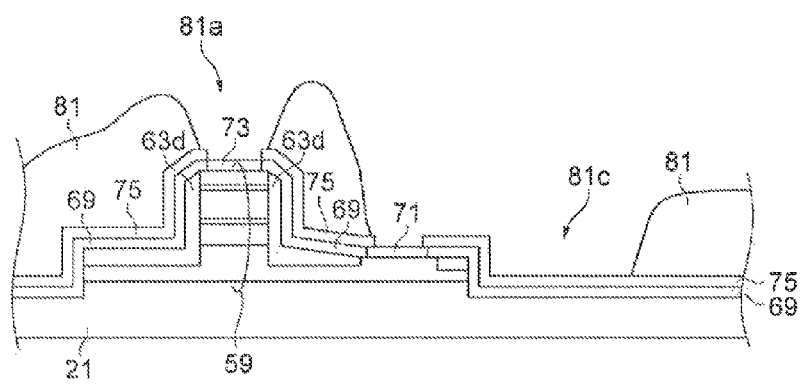

Next, as illustrated in FIGS. 13A and 13B, the resin mask 79 is preferably heat-treated in a baking furnace, for example. As a result of the heat-treatment, angular edges of the resin mask 79 may be rounded. For example, the heat treatment is performed at 160° C. for 30 minutes. In this embodiment, a resin mask 81 is formed as a result of the heat treatment of the resin mask 79. The surface of the resin mask 81 becomes smooth due to the heat treatment. In particular, the edges of the openings formed in the resin mask 81 become round and smooth so that disconnection of metal layers and non-uniformity in thickness of metal layers are preferably avoided in the subsequent steps.

The resin mask 81 has a first opening 81a located on the p-side ohmic electrode 73 on the device mesa 59, a second opening 81b located on the device isolation region in the third area 21d, and a third opening 81c located on the n-side ohmic electrode 71 on the device isolation mesa 65. The p-side ohmic electrode 73 is exposed through the first opening 81a to connect the wiring to the p-side ohmic electrode 73. The second opening 81b is used for forming the wiring from the p-side ohmic electrode 73 to a pad electrode. The n-side ohmic electrode 71 is exposed through the third opening 81c to connect the wiring to the n-side ohmic electrode 71. In addition, the third opening 81c is used for forming the wiring from the n-side ohmic electrode 71 to a pad electrode. The first opening 81a, the second opening 81b, and the third opening 81c each have an area or size needed for the corresponding electric conductor. For example, the third opening 81c extends from the device isolation mesa 65 on the second area 21e to the device isolation region (area where the substrate 21 is exposed). All of the protruding wall portions 63b in the device sections in the wafer WF are covered with the resin masks 81.

Figure 14A:
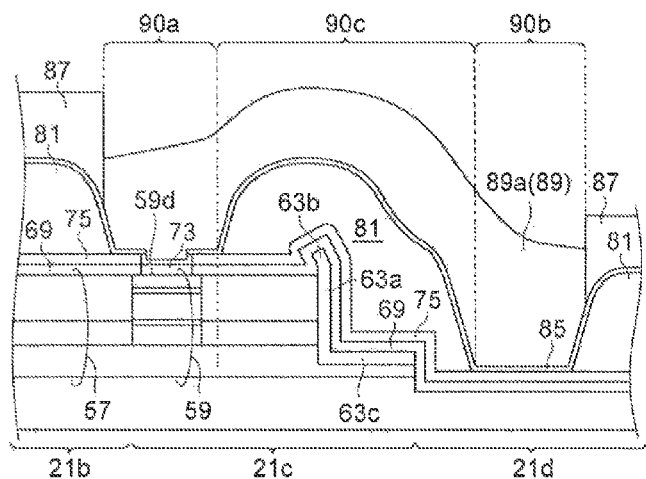
FIGS. 14A and 14B are diagrams showing one of the major steps of a method for manufacturing a waveguide-type semiconductor device.
Figure 14B:
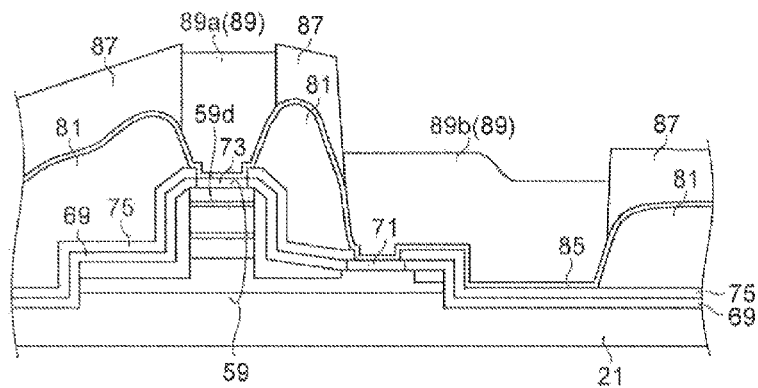

In step S111, as illustrated in FIGS. 14A and 14B, an electric conductor 83 that connects the n-side ohmic electrode 71 (p-side ohmic electrode 73) and a pad electrode to each other is formed by using the resin mask 81. The electric conductor 83 includes a seed metal layer 85 and a plating layer 89. An example of a method for forming the electric conductor 83 is described below.

Figure 15A:
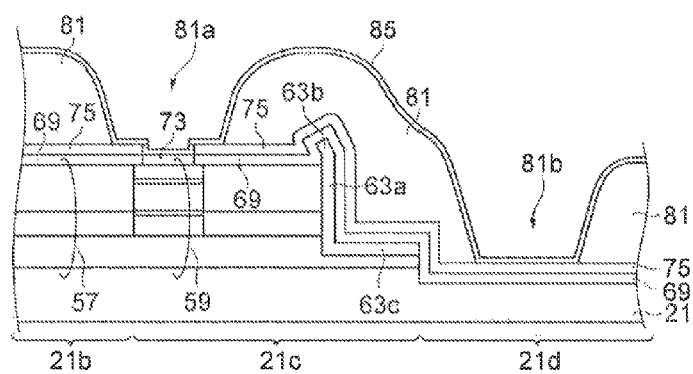
FIGS. 15A and 15B are diagrams showing one of the major steps of a method for manufacturing a waveguide-type semiconductor device.
Figure 15B:
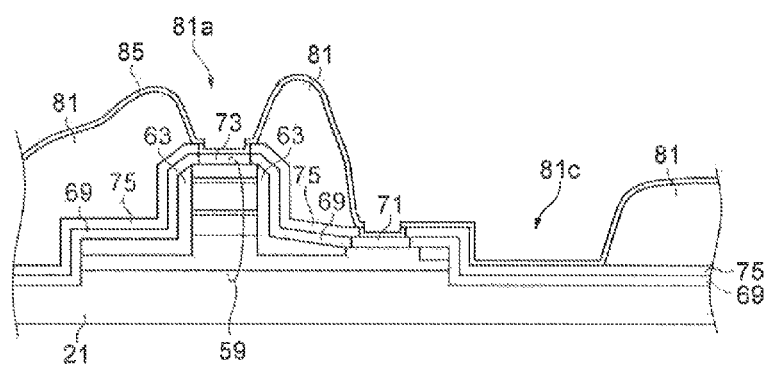

As illustrated in FIGS. 15A and 15B, the seed metal layer 85 is formed on the substrate 21. The seed metal layer 85 is composed of for example, TiW, Pt, or Au. The seed metal layer 85 is formed by using a sputtering method, for example. The thickness of the seed metal layer 85 is, for example, 0.2 µm. The seed metal layer 85 is formed on the resin mask 81, the n-side ohmic electrode 71, the p-side ohmic electrode 73, and the insulating layers 69 and 75.

Figure 16A:
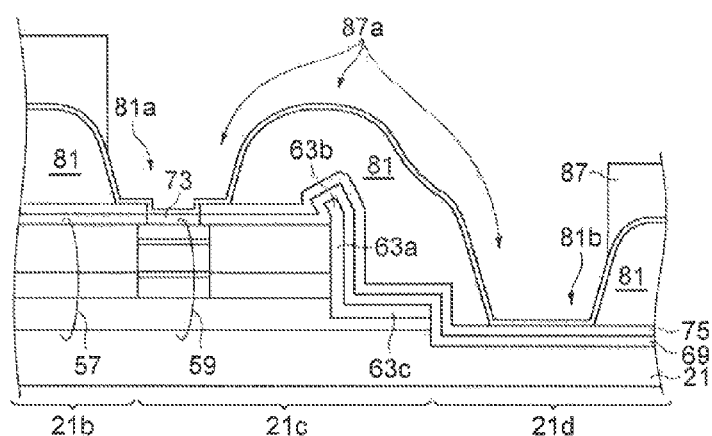
FIGS. 16A and 16B are diagrams showing one of the major steps of a method for manufacturing a waveguide-type semiconductor device.
Figure 16B:
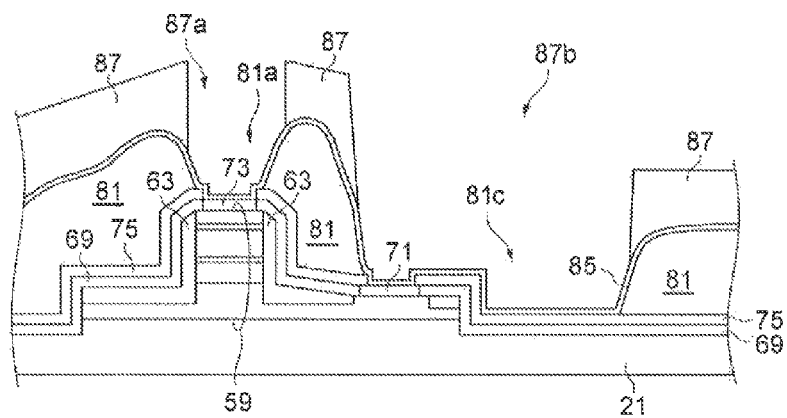

Next, as illustrated in FIGS. 16A and 16B, a mask 87 that defines a pattern of the electric conductor 83 is formed on the seed metal layer 85. The mask 87 includes, for example, a resist mask. The mask 87 has a first opening 87a and a second opening 87b. The first opening 87a is located on the first opening 81a and the second opening 81b of the resin mask 81. The second opening 87b is located on the third opening 81c of the resin mask 81. As a result, a pattern of the mask 87 having the first opening 87a and the second opening 87b is formed on the seed metal layer 85 that extends from the first opening 81a to the third opening 81c. The first opening 87a extends from the first opening 81a of the resin mask 81 to the second opening 81b of the resin mask 81 while passing over the protruding wall portion 63b. The seed metal layer 85 is exposed through the first openings 87a and the second opening 87b of the mask 87.

Referring again to FIGS. 14A and 14B, after the mask 87 that partly covers the seed metal layer 85 is formed, the plating layer 89 is formed by using the seed metal layer 85 as a seed. The plating layer 89 is composed of, for example, gold (Au). The plating layer 89 is formed on the portions of the seed metal layer 85 that are exposed through the first openings 87a and the second opening 87b of the mask 87. As a result, the plating layer 89 has substantially the same shape as that of the first openings 87a and the second opening 87b. In this embodiment, the seed metal layer 85 and the plating layer 89 constitute the electric conductor 83. A plating layer 89a corresponding to the first openings 87a contacts the p-side ohmic electrode 73. A plating layer 89b corresponding to the second opening 87b contacts the n-side ohmic electrode 71. The plating layer 89a is not connected to the plating layer 89b. The plating layer 89a extends from the first opening 81a of the resin mask 81 to the second opening 81b of the resin mask 81 by passing over the protruding wall portion 63b. The plating layer 89a (89) includes a first conducting portion 90a, a second conducting portion 90b, and a third conducting portion 90c. The first conducting portion 90a is connected to the p-side ohmic electrode 73 through the first opening 81a. The second conducting portion 90b is disposed in the second opening 81b and supported on the third area 21d. The third conducting portion 90c extends from the first conducting portion 90a to the second conducting portion 90b so as to pass over the protruding wall portion 63b while making contact with the surface of the resin mask 81.

Figure 17A:
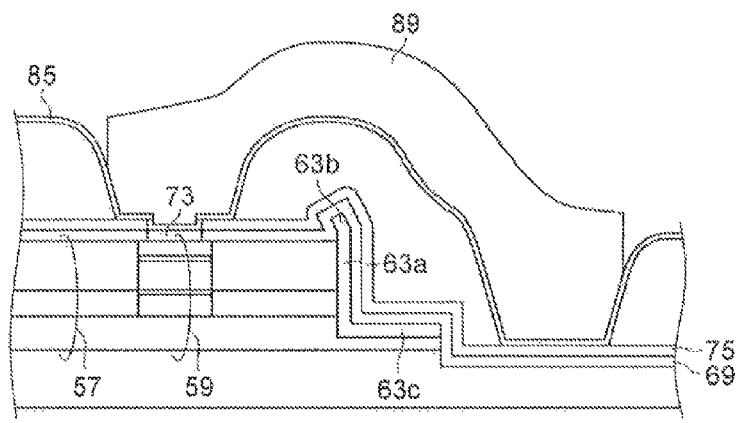
FIGS. 17A and 17B are diagrams showing one of the major steps of a method for manufacturing a waveguide-type semiconductor device.
Figure 17B:
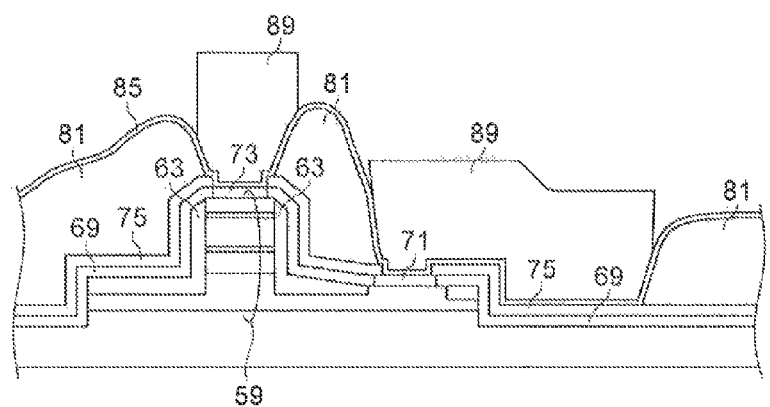

As illustrated in FIGS. 17A and 17B, after the plating layer 89 of the electric conductor 83 is formed, the mask 87 is removed. As a result, plating layers are formed in the openings of the mask 87. In addition, the seed metal layer 85 covered with the pattern of the mask 87 is exposed.

Figure 18A:
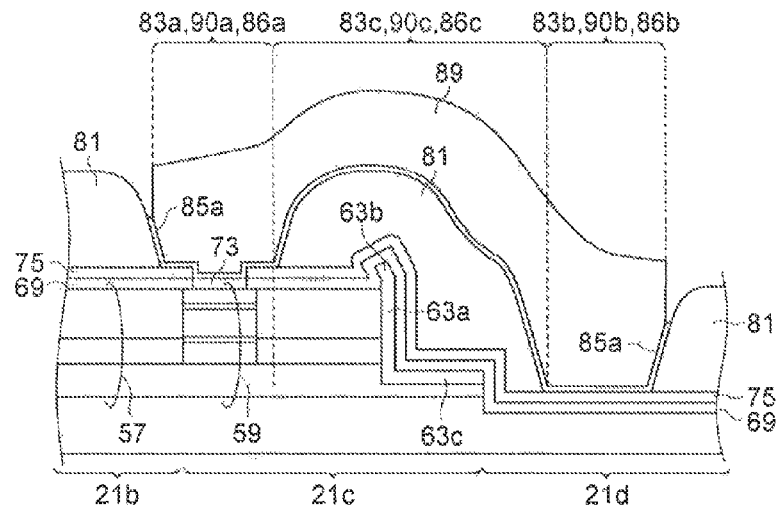
FIGS. 18A and 18B are diagrams showing one of the major steps of a method for manufacturing a waveguide-type semiconductor device.
Figure 18B:
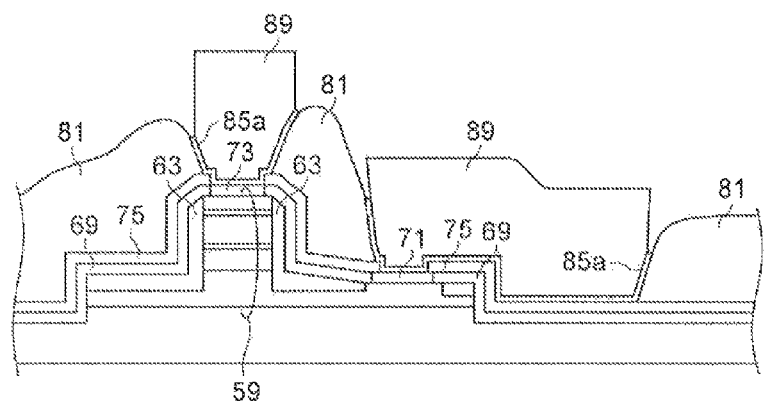

As illustrated in FIGS. 18A and 18B, after the mask 87 is removed, the seed metal layer 85 is etched by using the plating layer 89 as a mask. For example, ion milling that uses argon ions or the like is used for etching. After this etching step, a seed metal (patterned seed metal layer) 85a that has substantially the same pattern as the plating layer 89 is formed directly below the plating layer 89.

The electric conductor 83 is formed through the above-described process in step S111. The electric conductor 83 includes a first conductive portion 83a, a second conductive portion 83b, and a third conductive portion 83c. The first conductive portion 83a is disposed in the first opening 81a and contacts the p-side ohmic electrode 73. The second conductive portion 83b is disposed in the second opening 81b and supported on the third area 21d. The third conductive portion 83c extends from the first conductive portion 83a to the second conductive portion 83b so as to pass over the protruding wall portion 63b while making contact with the surface of the resin mask 81. The plating layer 89a includes the first conducting portion 90a, the second conducting portion 90b, and the third conducting portion 90c. The first conducting portion 90a is disposed in the first opening 81a and is electrically connected to the p-side ohmic electrode 73. The second conducting portion 90b is disposed in the second opening 81b and supported on the third area 21d. The third conducting portion 90c extends from the first conducting portion 90a to the second conducting portion 90b so as to pass over the protruding wall portion 63b while making contact with the surface of the resin mask 81. The seed metal 85a includes a first seed metal conductive portion 86a, a second seed metal conductive portion 86b, and a third seed metal conductive portion 86c. The first seed metal conductive portion 86a is disposed in the first opening 81a and connected to the p-side ohmic electrode 73. The second seed metal conductive portion 86b is disposed in the second opening 81b and supported on the third area 21d. The third seed metal conductive portion 86c extends from the first seed metal conductive portion 86a to the second seed metal conductive portion 86b so as to pass over the protruding wall portion 63b while making contact with the surface of the resin mask 81.

Figure 19A:
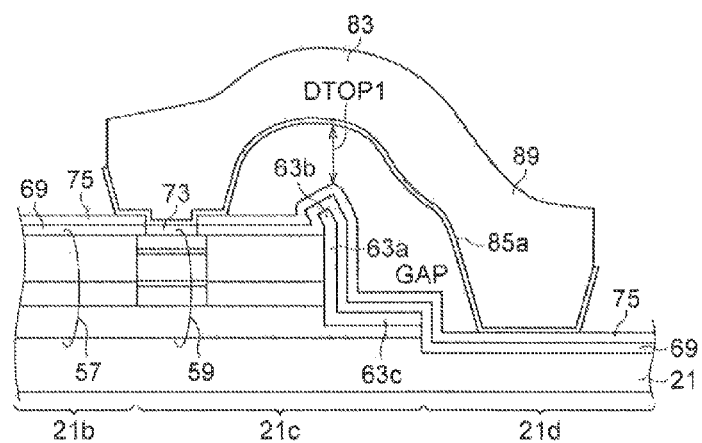
FIGS. 19A and 19B are diagrams showing one of the major steps of a method for manufacturing a waveguide-type semiconductor device.
Figure 19B:
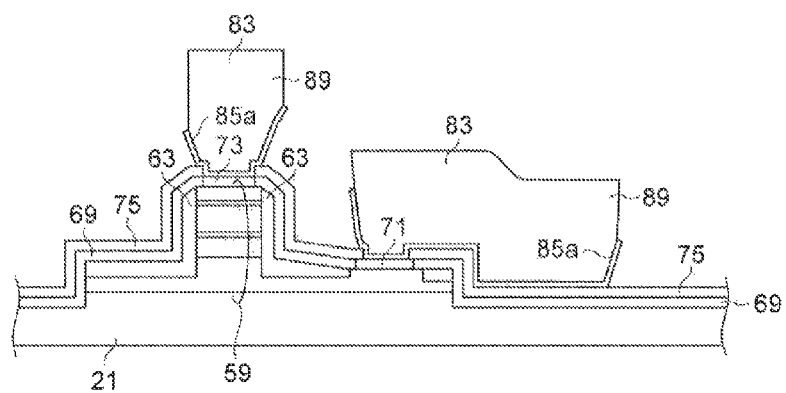

In step S112, as illustrated in FIGS. 19A and 19B, after the electric conductor 83 is formed, the resin mask 81 is removed. As a result, the electric conductor 83 extends over the protruding wall portion 63b while leaving a distance DTOP1 between the electric conductor 83 and the protruding wall portion 63b (to be exact, the insulating layers 69 and 75 on the protruding wall portion 63b).

The height of the protruding wall portion 63b in a first device section among the device sections SG is different from the height of the protruding wall portion 63b in a second device section different from the first device section, However, in every device section SG, the electric conductor 83 has a shape independent from the individual shape of the protruding wall portion 63b and extends over the protruding wall portion 63b while leaving a particular distance DTOP1 between the electric conductor 83 and the insulating layers 75 and 69 on the protruding wall portion 63b. A gap GAP is formed between the third conductive portion 83c of the electric conductor 83 and the insulating layers 75 and 69.

In step S113, the devices formed in individual device sections through the aforementioned steps are separated from each other and a plurality of semiconductor chips shown in FIG. 1 are obtained.

According to this production method, an epitaxial structure SP1 is formed in each of the device sections SG arranged into an array on a main surface WF0 of a wafer WF and this epitaxial structure SP1 includes a waveguide mesa 57 disposed in the first area 21b within the device section SG and a device mesa 59 disposed in the second area 21c within the same device section SG. A semiconductor region 63 is grown on side surfaces of the device mesa 59 in the epitaxial structure SP1. The semiconductor region 63 includes a side portion 63a grown on an end surface 59c of the device mesa 59. Moreover, the semiconductor region 63 includes a protruding wall portion 63b that protrudes from the side portion 63a in a direction perpendicular to a top surface 59d of the device mesa 59. The protruding wall portion 63b has a wall-like protruding shape and is higher than the top surface 59d of the device mesa 59. The height of the protruding wall portion 63b varies within the wafer. In the subsequent step, a p-side ohmic electrode 73 is formed on the top surface 59d of the device mesa 59. In addition, a wiring conductor is needed for the electrical connection to the n-side ohmic electrode 71. This wiring conductor needs to pass over the protruding wall portion 63b. however, the protruding wall portions 63b causes a disconnection of wiring conductors. As a result, a yield of III-V group compound semiconductor devices decreases. In this embodiment, the semiconductor region 63 includes the protruding wall portion 63b that is higher than the top surface 59d of the device mesa 59. An electric conductor is formed over the protruding wall portions 63b. The height of the protruding wall portion 63b varies within the wafer. This non-uniform distribution of the height of the protruding wall portion 63b varies wafer-to-wafer and lot-to-lot. Under such conditions, in order to avoid a decrease in device yield caused by occurrence of disconnection, an electric conductor 83 is formed. The electric conductor 83 includes a first conductive portion 83a to be connected to the p-side ohmic electrode 73, a second conductive portion 83b supported on the third area 21d, and a third conductive portion 83c that extends from the first conductive portion 83a to the second conductive portion 83b so as to pass over the protruding wall portion 63b. Moreover, the electric conductor 83 is formed so as to extend over the protruding wall portion 63b with a predetermined distance between the protruding wall portion 63b and the electric conductor 83. According to this wiring structure, the electric conductor 83 span across the protruding wall portion 63b with a distance DTOP1 from the protruding wall portion 63b. Accordingly, stable electrical connection is achieved irrespective of variation in the shape of the protruding wall portion 63b within the wafer.

The electric conductor 83 passes over the protruding wall portion 63b in a direction vertical to the surface of the substrate and also passes over the device isolation mesa 65 in the waveguide direction so as to be connected to the p-side ohmic electrode 73 from the third area 21d. According to this production method, in an embodiment in which the device isolation mesa 65 is formed in the second area 21c of the device section SG, the electric conductor 83 passes over the device isolation mesa 65 as well as the protruding wall portion 63b so as to be electrically connected to the p-side ohmic electrode 73 from the third area 21d.

Figure 20:
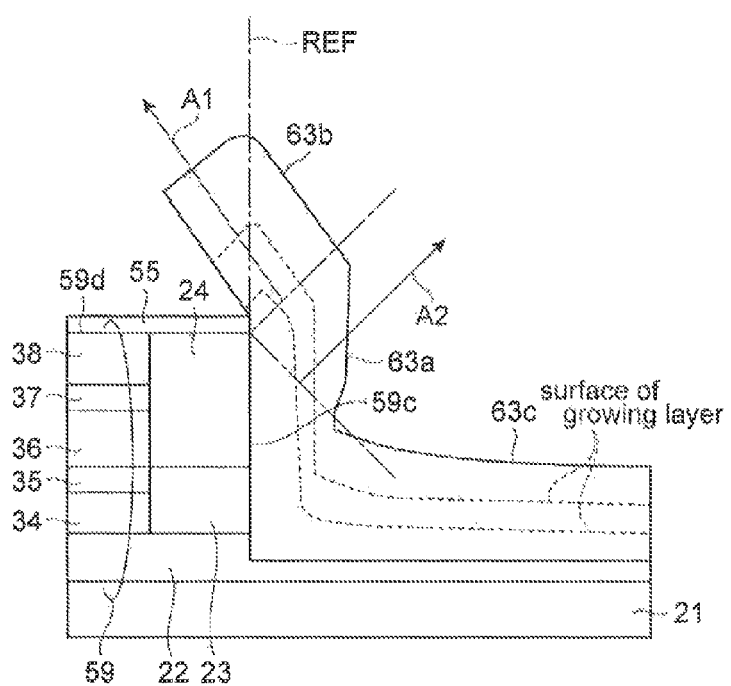
FIG. 20 is a diagram illustrating the cause of formation of a protruding wall portion from a viewpoint of crystal growth.

As illustrated in FIG. 20, the protruding wall portion 63b has a portion that bends toward the inner side of the device mesa 59 from the reference surface REF. The reference surface REF is defined as a surface that extends along the end surface 59e of the device mesa 59 and is orthogonal to the top surface 59d of the device mesa 59. According to this production method, the protruding wall portion 63b has a portion that bends toward the inner side of the top surface 59d. If an electric conductor is formed on the device mesa 59 to be connected to the ohmic electrode on the device mesa, the electric conductor may become thin or the electric conductor may be locally disconnected at the bending portion of the protruding wall portion 63b. In contrast, in this embodiment, in each of the device sections SG, the electric conductor 83 extends over the protruding wall portion 63b with a predetermined distance between the protruding wall portion 63b and the electric conductor 83. Even when the protruding wall portion 63b1 is formed, the influence of the protruding wall portion 63b is avoided in forming the electric conductors.

In FIG. 20, surfaces of growing layers that are formed during the process of forming the semiconductor region 63 are indicated by broken lines. A (111) surface is indicated by a dashed line. In forming the semiconductor region 63 on the end surface 59c of the device mesa 59, the rate of growth in a direction A1 parallel to the (111) surface in the vicinity of the insulator mask 55 for selective growth is significantly higher than the rate of growth in the direction A2 perpendicular to the (111) surface in the same area. Accordingly, as illustrated in FIG. 20, the protruding wall portion 63b that has a shape different from that of the semiconductor layer formed on the main surface 21a of the substrate 21 is formed in the vicinity of the insulator mask 55. The semiconductor region 63 needs to have a thickness of about 0.3 μm in terms of the thickness of the layer portion 63c on the main surface of the substrate in order to protect the end surface of the device mesa 59. However, when the semiconductor region 63 is formed to this thickness, the height of the protruding wall portion 63b of the semiconductor region 63 will be about 0.6 to 0.9 μm. Since the growth rate in the direction A1 parallel to the (111) surface is high, the height of the protruding wall portions 63b is about two to three times greater than the thickness of the layer portions 63c on the main surface of the substrate. If wiring is formed on this protruding portion by metal deposition through an evaporation method, a sputtering method, or the like, failures such as disconnection occur. In order to avoid this, the wiring forming method of this embodiment is useful.

For example, in the growth of a semiconductor buried region (semiconductor region 63) composed of Fe-doped InP or non-doped InP, methyl chloride may be added to a source gas used for growing the semiconductor region 63 in order to enhance the flatness of the surface of the semiconductor region 63. However, when the semiconductor region 63 is grown by adding methyl chloride to the source gas, growth of the protruding wall portion 63b on the top surface of the mesa structure is accelerated. As discussed earlier, the protruding wall portion 63b inhibits high-yield wiring formation. This embodiment is useful in such cases.

Figure 21A:
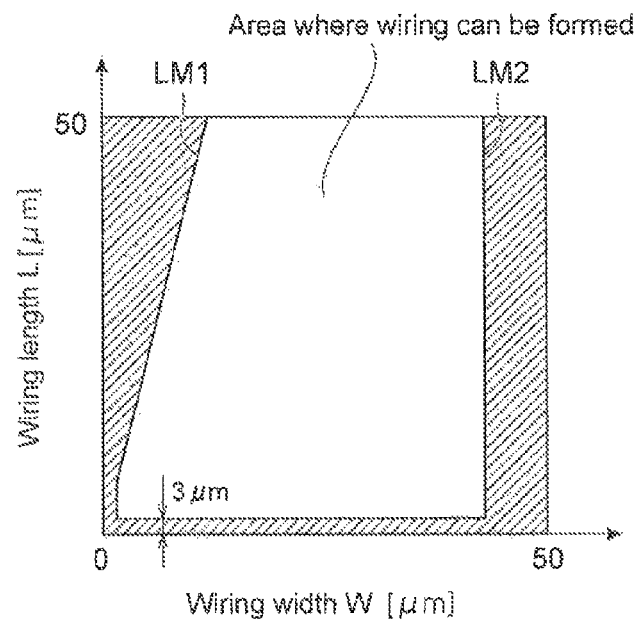
FIGS. 21A and 21B are diagrams illustrating formation of an electric conductor that passes over a protruding wall portion.
Figure 21B:
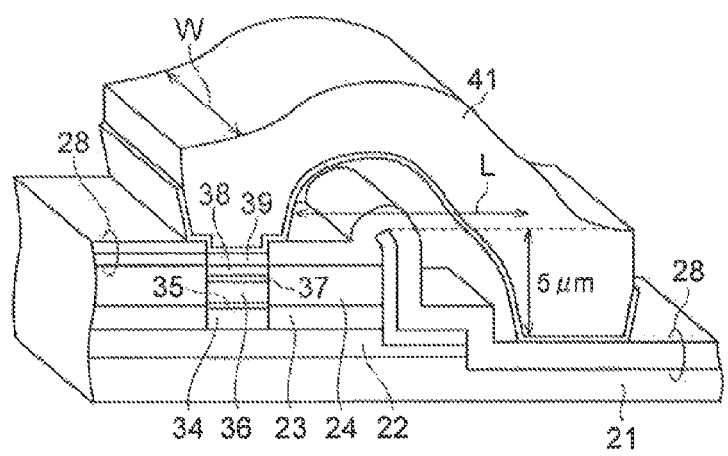

FIGS. 21A and 21B are diagrams illustrating formation of an electric conductor that passes over a protruding wall portion. FIG. 21A indicates the results of the study on feasibility of forming the electric conductor 83 illustrated in FIG. 21B. In FIGS. 21A and 21B, the thickness of the electric conductor 83 is set to be about 3 μm. In FIGS. 21A and 21B, the relationship between the wiring length L and the wiring width W in horizontal directions in a two-stage mesa structure including the device mesa 59 and the device isolation mesa 65 is shown. The wiring length L and the wiring width W are in the range of 50 μm or less. Here, the total height of the device mesa 59 and the device isolation mesa 65 is assumed to be 5 μm. Since it is difficult to form a two-stage mesa structure at a wiring length L of less than 3 μm, such cases are excluded from the study. When the wiring width W is less than 2 μm, the wiring strength is insufficient irrespective of the wiring length. The limit line LM1 is expressed as L=10×W (μm). The limit line LM2 is expressed as W=40 (μm). Formation of excessively long electric conductors has a problem of residual resin (resist). An excessively small electric conductor width poses a problem of strength. If the thickness of the electric conductor 83 is larger than 3 nm, the electric conductor having a wiring width W of less than 2 μm may be used because such an electric conductor has a sufficient wiring strength.

The present invention is not limited to the specific structures disclosed in the embodiments.

What is claimed is:

1. A method for manufacturing a waveguide-type semiconductor device, the method comprising the steps of:
   preparing a wafer having a plurality of device sections that each include a first area, a second area, and a third area arranged in a direction of a waveguide axis;
   forming an epitaxial structure on a main surface of the wafer, the epitaxial structure including a waveguide mesa disposed on the first area of at least one of the device sections and a device mesa disposed on the second area of the at least one device section, the device mesa having a side surface extending in a direction of the waveguide axis and an end surface extending in a direction orthogonal to the waveguide axis;
   forming a mask for selective growth on the epitaxial structure;
   growing a semiconductor region on the side surface and the end surface of the device mesa by using the mask for selective growth so that the semiconductor region grown on the end surface of the device mesa includes a side portion having a layer shape and a protruding wall portion protruding from the side portion in a direction perpendicular to a top surface of the device mesa;
   forming an ohmic electrode on the top surface of the device mesa after growing the semiconductor region;
   forming a resin layer on the device mesa and the semiconductor region, the resin layer covering the protruding wall portion after forming the ohmic electrode;
   forming a resin mask having a first opening located on the ohmic electrode and a second opening located on the third area of the at least one device section;
   forming an electric conductor that includes a first conductive portion disposed in the first opening and connected to the ohmic electrode, a second conductive portion disposed in the second opening and supported on the third area of the at least one device section, and a third conductive portion that extends from the first conductive portion to the second conductive portion, the third conductive portion passing over the protruding wall portion while making contact with a surface of the resin mask; and
   removing the resin mask after forming the electric conductor.

2. The method for manufacturing a waveguide-type semiconductor device according to claim 1, wherein the protruding wall portion of the semiconductor region is higher than the top surface of the device mesa, and
   in the step of removing the resin mask, the electric conductor extends over the protruding wall portion with a predetermined distance between the electric conductor and the protruding wall portion.

3. The method for manufacturing a waveguide-type semiconductor device according to claim 1, wherein the protruding wall portion in a first device section among the plurality of device sections has a height different from a height of the protruding wall portion in a second device section among the plurality of device sections.

4. The method for manufacturing a waveguide-type semiconductor device according to claim 1, further comprising a step of forming a device isolation mesa on the first area and the second area of the at least one device section after growing the semiconductor region,
wherein the device isolation mesa is disposed around the device mesa,
the third area of the at least one device section is located outside the device isolation mesa, and
the electric conductor is connected to the ohmic electrode from the third area while passing over the device isolation mesa and the protruding wall portion.

5. The method for manufacturing a waveguide-type semiconductor device according to claim 1, wherein the protruding wall portion has a portion that bends toward an inner side from an edge of the top surface of the device mesa with respect to a reference surface that extends along the end surface of the device mesa, the reference surface being orthogonal to the top surface of the device mesa.

6. The method for manufacturing a waveguide-type semiconductor device according to claim 1, wherein the step of forming an epitaxial structure includes the steps of:
forming a semiconductor stack on the main surface of the wafer, the semiconductor stack including a first stacked semiconductor layer for forming the waveguide mesa and a second stacked semiconductor layer for forming the device mesa;
forming an insulator mask on the semiconductor stack, the insulator mask including a first pattern for forming the waveguide mesa and a second pattern for forming the device mesa in each of the device sections; and
forming the waveguide mesa and the device mesa in each of the device sections by etching the semiconductor stack by using the insulator mask,
wherein the mask for selective growth includes the insulator mask that is used for etching the semiconductor stack in the step of forming the waveguide mesa and the device mesa.

7. The method for manufacturing a waveguide-type semiconductor device according to claim 6, wherein the second stacked semiconductor layer includes an optical absorption layer that constitutes a photodiode,
the waveguide mesa is connected to the device mesa,
the first stacked semiconductor layer appears at the end surface of the device mesa, and
the waveguide mesa reaches another end surface of the device mesa opposite to the end surface.

8. The method for manufacturing a waveguide-type semiconductor device according to claim 6, wherein the second stacked semiconductor layer appears at the side surfaces of the device mesa.

9. The method for manufacturing a waveguide-type semiconductor device according to claim 1, wherein the wafer is composed of a III-V group compound semiconductor,
the main surface of the wafer includes a (100)-oriented surface or a surface inclined from the (100)-oriented surface by an off-angle of 0.09 degrees or less, and
the waveguide axis extends in a direction parallel to a [0-1-1] direction.

* * * * *